(12) United States Patent
Huang et al.

(10) Patent No.: US 11,796,870 B2
(45) Date of Patent: Oct. 24, 2023

(54) ARRAY SUBSTRATE, LIGHT CONTROL PANEL, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianhua Huang, Beijing (CN); Yingmeng Miao, Beijing (CN); Chongyang Zhao, Beijing (CN); Zhihua Sun, Beijing (CN); Yingying Qu, Beijing (CN); Ting Dong, Beijing (CN); Yifu Chen, Beijing (CN); Lingdan Bo, Beijing (CN); Senwang Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 262 days.

(21) Appl. No.: 17/288,963

(22) PCT Filed: Sep. 27, 2020

(86) PCT No.: PCT/CN2020/118027
§ 371 (c)(1),
(2) Date: Apr. 27, 2021

(87) PCT Pub. No.: WO2021/093475
PCT Pub. Date: May 20, 2021

(65) Prior Publication Data
US 2022/0308411 A1  Sep. 29, 2022

(30) Foreign Application Priority Data
Nov. 15, 2019 (CN) .......................... 201911118883.5

(51) Int. Cl.
G02F 1/1343 (2006.01)
G02F 1/1362 (2006.01)
G02F 1/1335 (2006.01)

(52) U.S. Cl.
CPC .. *G02F 1/134372* (2021.01); *G02F 1/134309* (2013.01); *G02F 1/136286* (2013.01); *G02F 1/133512* (2013.01)

(58) Field of Classification Search
CPC ......... G02F 1/134372; G02F 1/134309; G02F 1/13463; G02F 2201/122
See application file for complete search history.

(56) References Cited

U.S. PATENT DOCUMENTS

| 10,295,873 B2 | 5/2019 | Shao et al. |
| 11,003,035 B2 | 5/2021 | Liu et al. |
| 2022/0137470 A1* | 5/2022 | Du .................... G02F 1/136286 349/33 |

FOREIGN PATENT DOCUMENTS

| CN | 101666949 A | 3/2010 |
| CN | 102176095 A | 9/2011 |
| (Continued) | | |

OTHER PUBLICATIONS

International Search Report for corresponding International application No. PCT/CN2020/118027, dated Dec. 30, 2020 11 pages.

*Primary Examiner* — Dung T Nguyen
(74) *Attorney, Agent, or Firm* — Leason Ellis LLP

(57) ABSTRACT

An array substrate, a light control panel, and a display device are disclosed. The array substrate includes a data line layer, a base substrate, a first electrode layer, and a second electrode layer. The first electrode layer includes gate lines, each gate line integrally extends along a first direction, and includes first broken line structures directly connected in sequence in the first direction; the data line layer includes data lines, each data line integrally extends along a second (Continued)

direction; the gate lines and the data lines cross each other to define light control pixel units; the second electrode layer includes common electrodes, each common electrode is provided in at least one light control pixel unit; and at least one gate line at least partially overlaps with an orthographic projection of at least one common electrode on the first electrode layer.

20 Claims, 12 Drawing Sheets

(56) References Cited

FOREIGN PATENT DOCUMENTS

| | | |
|---|---|---|
| CN | 105824161 A | 8/2016 |
| CN | 108983463 A | 12/2018 |
| CN | 109581728 A | 4/2019 |
| CN | 110780500 A | 2/2020 |
| KR | 20080078173 A | 8/2008 |

* cited by examiner

ARRAY SUBSTRATE, LIGHT CONTROL PANEL, AND DISPLAY DEVICE

CROSS-REFERENCE TO RELATED APPLICATION

This application is a U.S. National Stage Application under 35 U.S.C. § 371 of International Patent Application No. PCT/CN2020/118027, filed on Sep. 27, 2020, which claims priority of Chinese Patent Application No. 201911118883.5 filed on Nov. 15, 2019, both of which are incorporated by reference in their entireties.

TECHNICAL FIELD

Embodiments of the present disclosure relate to an array substrate, a light control panel, and a display device.

BACKGROUND

A liquid crystal display device comprises a backlight module (backlight unit) and a liquid crystal panel, the backlight module is provided on a non-display side of the liquid crystal panel to provide a light source for a display operation of the display panel. The liquid crystal panel comprises a polarizer, an array substrate, an opposite substrate, and a liquid crystal molecular layer filled between the two substrates. The liquid crystal display device deflects the liquid crystal molecules in the liquid crystal molecular layer by forming an electric field between the array substrate and the opposite substrate, and the deflected liquid crystal molecules can form a liquid crystal light valve by cooperating with the polarizer. Because the liquid crystal molecular layer does not emit light itself, the display function needs to be achieved by means of the backlight module. With the continuous development of display technology, users put forward higher and higher requirements for the contrast ratio, brightness uniformity, and the like of the display devices.

SUMMARY

At least one embodiment of the present disclosure provides an array substrate, which comprises a data line layer, and a base substrate, a first electrode layer, an insulation layer, and a second electrode layer, which are arranged in sequence. The first electrode layer comprises a plurality of gate lines, each of the plurality of gate lines integrally extends along a first direction, and comprises a plurality of first broken line structures directly connected in sequence in the first direction; the data line layer comprises a plurality of data lines, each of the plurality of data lines integrally extends along a second direction crossing with the first direction; the plurality of gate lines and the plurality of data lines cross each other to define a plurality of light control pixel units; the second electrode layer comprises a plurality of common electrodes arranged in an array, each of the plurality of common electrodes is provided in at least one of the plurality of light control pixel units; and at least one of the plurality of gate lines at least partially overlaps with an orthographic projection of at least one of the plurality of common electrodes on the first electrode layer.

For example, in at least one example of the array substrate, orthographic projections of two sides, which are opposite in the second direction, of each of the plurality of common electrodes on the first electrode layer respectively overlap with sides, which are close to each of the plurality of common electrodes, of corresponding two gate lines.

For example, in at least one example of the array substrate, a space is provided between two common electrodes adjacent in the second direction, and a gate line overlapping with orthographic projections of the two common electrodes adjacent in the second direction on the first electrode layer overlaps with an orthographic projection of the space on the first electrode layer.

For example, in at least one example of the array substrate, each of the plurality of common electrodes comprises a plurality of strip electrodes arranged side by side in the first direction, and a first connection sub-electrode and a second connection sub-electrode that sever as two sides, which are opposite in the second direction, of each of the plurality of common electrodes; the first connection sub-electrode is connected with first ends of the plurality of strip electrodes, the second connection sub-electrode is connected with second ends of the plurality of strip electrodes; and orthographic projections of the first connection sub-electrode and the second connection sub-electrode on the first electrode layer partially overlap with sides, which are close to each of the plurality of common electrodes, of corresponding two gate lines, respectively.

For example, in at least one example of the array substrate, each of the first connection sub-electrode and the second connection sub-electrode has an identical extension trend with corresponding regions of the plurality of gate lines, the corresponding regions of the plurality of gate lines are regions of the plurality of gate lines that overlap with each of the first connection sub-electrode and the second connection sub-electrode in the second direction; and the plurality of strip electrodes have an identical extension trend with corresponding regions of the plurality of data lines, the corresponding regions of the plurality of data lines are regions of the plurality of data lines that overlap with the plurality of strip electrodes in the first direction.

For example, in at least one example of the array substrate, each of the plurality of data lines comprises a plurality of second broken line structures directly connected in sequence in the second direction; and the plurality of first broken line structures comprised in the plurality of gate lines are in one-to-one correspondence to the plurality of light control pixel units, and the plurality of second broken line structures comprised in the plurality of data lines are in one-to-one correspondence to the plurality of light control pixel units.

For example, in at least one example of the array substrate, the first electrode layer further comprises a plurality of pixel electrodes; each of the plurality of pixel electrodes is disposed in a corresponding light control pixel unit; and the plurality of pixel electrodes are disposed at intervals with the plurality of gate lines.

For example, in at least one example of the array substrate, the plurality of pixel electrodes are plate electrodes, and an orthographic projection of each of the plate electrodes on the second electrode layer is a continuous plane.

For example, in at least one example of the array substrate, each of the plurality of common electrodes comprises: a plurality of strip electrodes arranged side by side in the first direction, and a first connection sub-electrode and a second connection sub-electrode that serve as two sides, which are opposite in the second direction, of each of the plurality of common electrodes; the first connection sub-electrode is connected with first ends of the plurality of strip electrodes, the second connection sub-electrode is connected with second ends of the plurality of strip electrodes; and orthographic projections of the first connection sub-electrode and the second connection sub-electrode on the first electrode layer partially overlap with sides, which are close to each of the plurality of common electrodes, of corresponding two gate lines, respectively; and orthographic projections of the plurality of pixel electrodes on the second electrode layer are exposed from spaces between adjacent strip electrodes comprised in corresponding common electrodes.

For example, in at least one example of the array substrate, each of the plurality of common electrodes and the plurality of pixel electrodes comprises a transparent conductive oxide, and each of the plurality of gate lines comprises metal.

For example, in at least one example of the array substrate, a surface of a side, which is close to the second electrode layer, of each of the plurality of gate lines has a concave-convex structure.

At least one embodiment of the present disclosure also provides a light control panel, which comprises: an opposite substrate, a liquid crystal layer, and an array substrate provided by at least one embodiment of the present disclosure. The array substrate and the opposite substrate are arranged oppositely, and the liquid crystal layer is sandwiched between the array substrate and the opposite substrate.

For example, in at least one example of the light control panel, the opposite substrate comprises a black matrix layer; the black matrix layer comprises a plurality of black matrix units, and each of the plurality of black matrix units integrally extends along the first direction; and orthographic projections of the plurality of gate lines on the black matrix layer are located in corresponding black matrix units, respectively.

For example, in at least one example of the light control panel, each of the plurality of black matrix units comprises a plurality of black matrix structures directly connected in sequence in the first direction, and orthographic projections of the plurality of first broken line structures comprised in the plurality of gate lines on the black matrix layer are located in corresponding black matrix structures, respectively.

For example, in at least one example of the light control panel, a ratio of a width of each of the plurality of black matrix units to a width of a corresponding gate line is between 1 and 2.5.

At least one embodiment of the present disclosure also provides a display device, which comprises: a display panel, a backlight unit, and a light control panel provided by at least one embodiment of the present disclosure. The display panel, the light control panel, and the backlight unit are stacked on each other, the display panel is located at a light emission side of the light control panel, and the backlight unit is located at a side of the light control panel away from the display panel.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor of the present disclosure has noticed in the research that a common liquid crystal display device (for example, a liquid crystal display device based on advanced super dimension switch technology and with a single liquid crystal cell) usually has the problem of light leakage in the dark state, which makes the contrast ratio of the display screen of the liquid crystal display device relatively low. In the research, the inventor of the present disclosure has noticed that a liquid crystal display device with double liquid crystal cells may be used to improve the contrast ratio of the display screen, which will be exemplarily explained with reference to FIG. 1A.

Figure 1A:
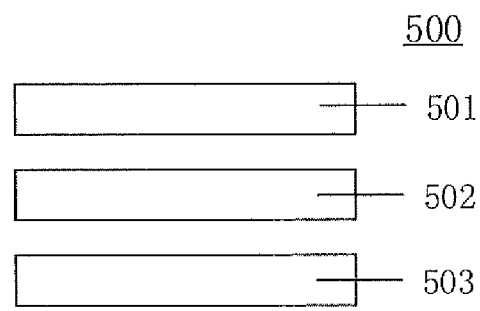
FIG. 1A illustrates a schematic cross-sectional view of a liquid crystal display device.
Figure 1B:
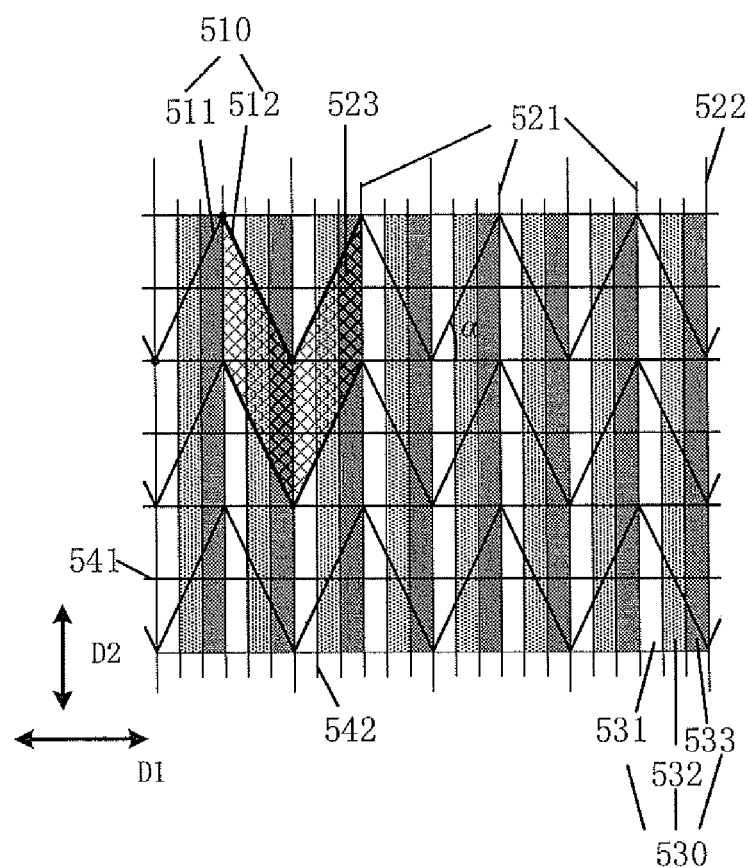
FIG. 1B illustrates a schematic plane view of a light control panel and a display panel of the liquid crystal display device shown in FIG. 1A.
Figure 1C:
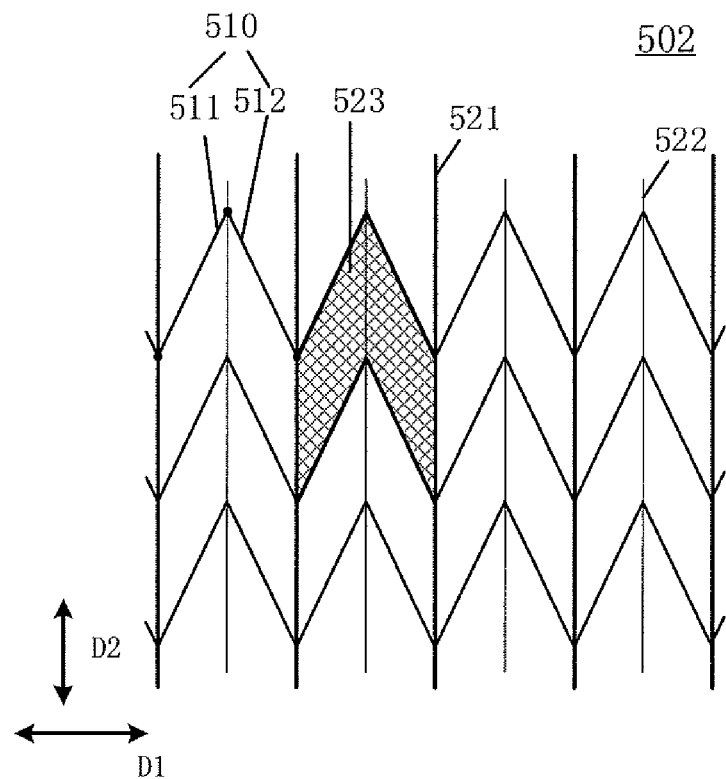
FIG. 1C illustrates a schematic plane view of a light control panel of the liquid crystal display device shown in FIG. 1A.

FIG. 1A illustrates a schematic cross-sectional view of a liquid crystal display device 500. As shown in FIG. 1A, the liquid crystal display device 500 includes a backlight unit 503, a light control panel 502, and a display panel 501, which are arranged in sequence. FIG. 1B illustrates a schematic plane view of a light control panel 502 and a display panel 501 of the liquid crystal display device 500 shown in FIG. 1A. FIG. 1C illustrates a schematic plane view of the light control panel 502 (an array substrate 551 of the light control panel 502) of the liquid crystal display device 500 shown in FIG. 1A. For example, the light control panel 502 is configured to adjust the intensity of light emitted by the backlight unit 503 and incident on the display panel 501. For example, the light emitted from the light control panel 502 is white light, that is, the light control panel 502 does not have a color adjustment function.

As shown in FIG. 1B, the display panel 501 includes a plurality of first signal lines 541 extending along a first direction D1 and a plurality of second signal lines 542 extending along a second direction D2. The first signal lines 541 and the second signal lines 542 intersect to define a plurality of display sub-pixel units arranged in an array, and the display sub-pixel units form a plurality of display pixel units 530 arranged in an array; each display pixel unit 530 includes a first display sub-pixel unit 531, a second display sub-pixel unit 532, and a third display sub-pixel unit 533. The first display sub-pixel unit 531, the second display sub-pixel unit 532, and the third display sub-pixel unit 533 are, for example, a red display sub-pixel unit, a green display sub-pixel unit, and a blue display sub-pixel unit, respectively. For example, the first direction D1 is perpendicular to the second direction D2. For example, the first signal lines 541 are gate lines of the display panel 501, and the second signal lines 542 are data lines of the display panel 501.

As shown in FIG. 1B and FIG. 1C, the light control panel 502 (the array substrate 551 of the light control panel 502) includes a plurality of gate lines 510 respectively extending along a first direction D1, and a plurality of data lines 521 respectively extending along a second direction D2 intersecting with the first direction D1; the gate lines 510 and the data lines 521 intersect to define a plurality of light control pixel units 523. For example, the light control panel 502 further includes a plurality of common electrode lines 522 respectively extending along the second direction D2. For example, the light control panel 502 includes a plurality of light control units arranged in an array, and the light control pixel units 523 of the array substrate 551 are arranged in the corresponding light control units, respectively.

For example, the light control panel 502 can adjust the transmissivity of each light control unit of the light control panel based on the data signal received by the data line 521. Therefore, the light control unit of the light control panel 502 may be used to control the intensity of light incident on the display sub-pixel unit of the display panel 501 corresponding to the light control unit, thus the light control panel 502 may be used to provide the adjusted backlight to the display panel 501. For example, by providing the light control panel 502 in the display device 500, the transmissivity of the light control unit corresponding to the region where the brightness of the display screen of the liquid crystal display device is low (e.g., the brightness is zero) can be made low (e.g., the transmissivity is equal to or close to zero), in this case, the problem of light leakage in the dark state that may occurs in the display panel 501 has less adverse influence on the contrast ratio of the display screen. Therefore, a liquid crystal display device with double liquid crystal cells (i.e., a display device with a light control panel) can improve the contrast ratio of the display screen.

For example, the width of the first signal line 541 is larger than the width of the gate line 510. For example, the size of the first display sub-pixel unit 531 in the first direction D1, the size of the second display sub-pixel unit 532 in the first direction D1, and the size of the third display sub-pixel unit 533 in the first direction D1 are the same, for example, the size of the first display sub-pixel unit 531 in the second direction D2, the size of the second display sub-pixel unit 532 in the second direction D2, and the size of the third display sub-pixel unit 533 in the second direction D2 are the same.

As shown in FIG. 1B and FIG. 1C, each gate line 510 of the light control panel 502 may be implemented as a broken line; each gate line 510 includes a plurality of first trace portions 511 and a plurality of second trace portions 512. The first trace portions 511 and the second trace portions 512 are alternately arranged, and a first trace portion 511 and a second trace portion 512, which are adjacent, are connected with each other. As shown in FIG. 1B, the included angle α (acute angle) between the first trace portion 511 (or/and the second trace portion 512) and the first direction D1 is about 50-70 degrees, so as to reduce the moiré pattern problem of the liquid crystal display device 500. For example, the first trace portions 511 and the second trace portions 512 are straight trace portions (straight trace).

Figure 1D:
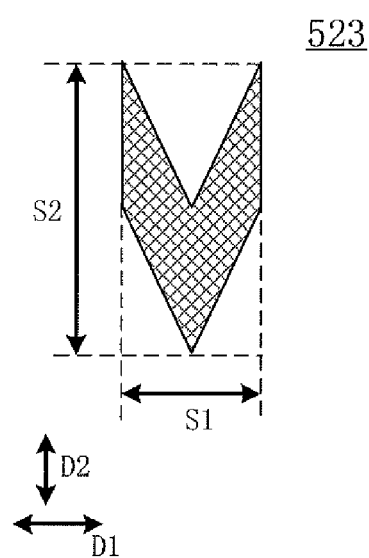
FIG. 1D illustrates a light control pixel unit of the light control panel shown in FIG. 1A.

FIG. 1D illustrates the light control pixel unit 523 of the light control panel 502 shown in FIG. 1A. As shown in FIG. 1D, the size of the light control pixel unit 523 in the first direction D1 is S1, and the size of the light control pixel unit 523 in the second direction D2 is S2. As shown in FIG. 1B-FIG. 1D, the size S1 of the light control pixel unit 523 in the first direction D1 is equal to twice the size of the display pixel unit 530 in the first direction D1, and the size S2 of the light control pixel unit 523 in the second direction D2 is equal to four times the size of the display pixel unit 530 in the second direction D2.

The inventor of the present disclosure has noticed in the research that the problem of unevenness brightness of the liquid crystal display device 500 can be suppressed by making the gate line 510 implement as a broken line. For example, the problem of unevenness brightness may be a problem of black-white stripe defect or horizontal stripe defect (i.e., black-white stripe defect under a side viewing angle). Specific analysis is as follows. In a case where the gate line 510 (and the black matrix unit that blocks the gate line) is implemented as a straight line, if alignment error occurs when the light control panel 502 and the display panel 501 are attached, the orthographic projection of the gate line 510 (straight line) on the display panel 501 will overlap with a row of display pixels of the display panel 501, and the gate lines 510 will block light from the backlight unit 503 and make the brightness of the region of the liquid crystal display device 500 corresponding to the gate lines 510 close to zero (that is, corresponding to black stripes), the region of the liquid crystal display device 500 other than the region corresponding to the gate lines 510 correspond to white stripes. In this case, the liquid crystal display device 500 has black stripes and white stripes that are alternately arranged in the second direction D2, that is, the liquid crystal display device 500 may have a problem of black-white stripe defect. In a case where the gate line 510 is implemented as a broken line, the problem of black-white stripe defect or horizontal stripe defect of the liquid crystal display device 500 can be suppressed.

Figure 2A:
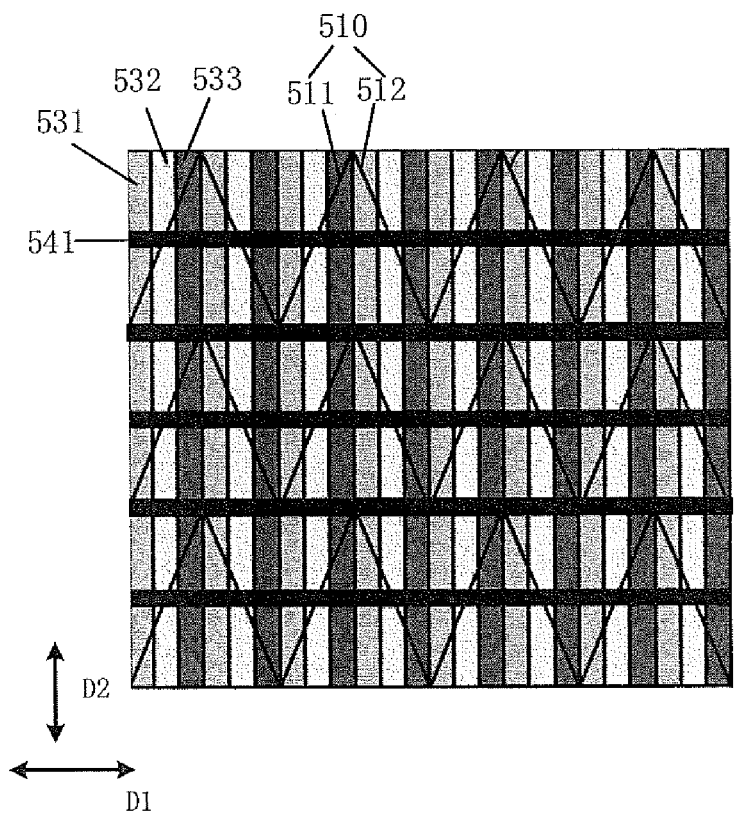
FIG. 2A illustrates a schematic diagram of a blocking situation of gate lines of the liquid crystal display device shown in FIG. 1A under a first viewing angle.
Figure 2B:
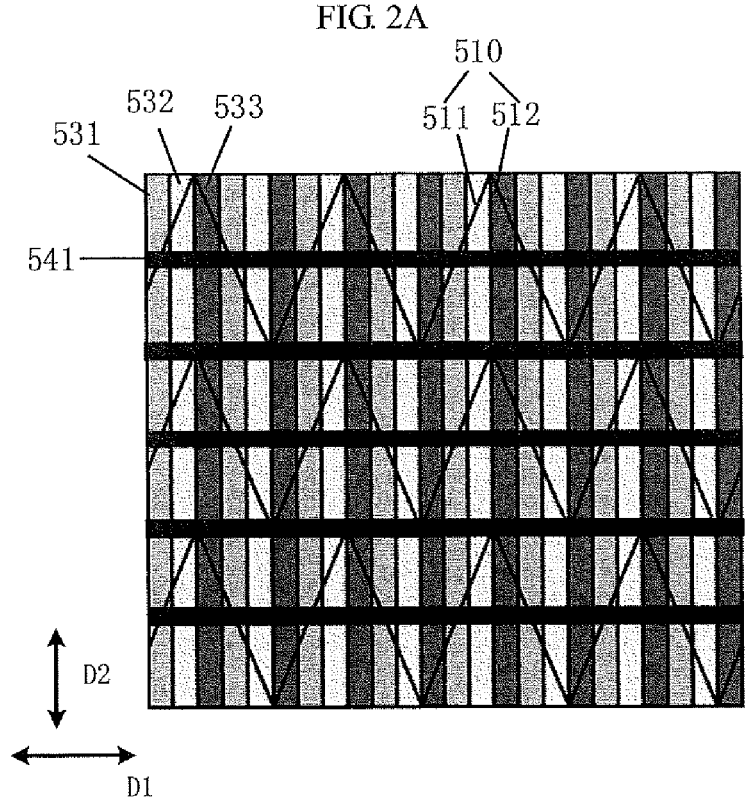
FIG. 2B illustrates a schematic diagram of a blocking situation of gate lines of the liquid crystal display device shown in FIG. 1A under a second viewing angle.

The inventor of the present disclosure also has noticed in the research that the liquid crystal display device 500 shown in FIG. 1A and FIG. 1B may have a color unevenness problem (rainbow pattern problem). The rainbow pattern problem is a problem of uneven color mixing in different regions of the display device. Specifically, if the display device has a rainbow pattern problem, in a case where the predetermined display screen of the display device is a white screen, the actual screen observed by the user has color stripes. The rainbow pattern problem is related to the following reasons, that is, the gate lines 510 (and the black matrix units that block the gate lines) corresponding to the regions of the display sub-pixel units of different colors have different shielding effects on the light emitted by the backlight unit under different viewing angles. Next, the rainbow pattern problem will be exemplarily explained with reference to FIG. 2A and FIG. 2B. FIG. 2A illustrates a schematic diagram of the blocking situation of the gate lines 510 of the liquid crystal display device 500 shown in FIG. 1A under a first viewing angle (e.g., a front viewing angle), and FIG. 2B illustrates a schematic diagram of the blocking situation of the gate lines 510 of the liquid crystal display device 500 shown in FIG. 1A under a second viewing angle (e.g., a side viewing angle). For convenience of explanation, it is assumed here that the size of the first display sub-pixel unit 531 in the first direction D1, the size of the second display sub-pixel unit 532 in the first direction D1, and the size of the third display sub-pixel unit 533 in the first direction D1 are the same as each other, the first trace portion 511 and the second trace portion 512 are both straight trace portions (straight traces). As shown in FIG. 2A and FIG. 2B, because the sizes of the first display sub-pixel unit 531, the second display sub-pixel unit 532, and the third display sub-pixel unit 533 in the first direction D1 are the same as each other, the length of the trace portion (e.g., the first trace portion 511) corresponding to the first display sub-pixel unit 531, the length of the trace portion (e.g., the first trace portion 511) corresponding to the second display sub-pixel unit 532, and the length of the trace portion (e.g., the first trace portion 511) corresponding to the third display sub-pixel unit 533 are same. As shown in FIG. 2A, under the first viewing angle, because a portion of the trace portion (e.g., the first trace portion 511) corresponding to the second display sub-pixel unit 532 also overlaps with the first signal line 541, under the first viewing angle, the area of the overlapping region between the trace portion (e.g., the first trace portion 511) and the first display sub-pixel unit 531, and the area of the overlapping region between the trace portion (e.g., the first trace portion 511) and the third display sub-pixel unit 533 are both larger than the area of the overlapping region between the trace portion (e.g., the first trace portion 511) and the second display sub-pixel unit 532, that is, the light emitted by the backlight unit is minimally blocked by the trace portion (e.g., the first trace portion 511) corresponding to the second display sub-pixel unit 532, and the intensity of the light incident on the second display sub-pixel unit 532 is the strongest; in this case, the display screen under the first viewing angle is biased toward the color of the second display sub-pixel unit 532. For similar reasons, as shown in FIG. 2B, the display screen under the second viewing angle is biased toward the color of the first display sub-pixel unit 531 (i.e., the display sub-pixel unit in the column where the trace portion overlaps with the first signal line 541). Because the user observes the liquid crystal display device 500 within a certain viewing angle range, the actual screen observed by the user has color stripes. It should be noted that the portion of the trace portion corresponding to the display sub-pixel unit refers to the portion of the trace portion between two intersections where the trace portion and the boundary of the display sub-pixel unit (e.g., a column of display sub-pixel units where the display sub-pixel unit is located) in the first direction intersect.

In the research, the inventor of the present disclosure has also noticed that, in order to avoid the problem of light leakage in a dark state that may occur around the gate lines 510 of the light control panel shown in FIG. 1C, the width of the black matrix unit used to block the gate line 510 is increased, which makes the rainbow pattern problem of the display device including the light control panel shown in FIG. 1C more serious. The following is an exemplary description with reference to FIG. 3A-FIG. 3C and FIG. 4A-FIG. 4B.

Figure 3A:
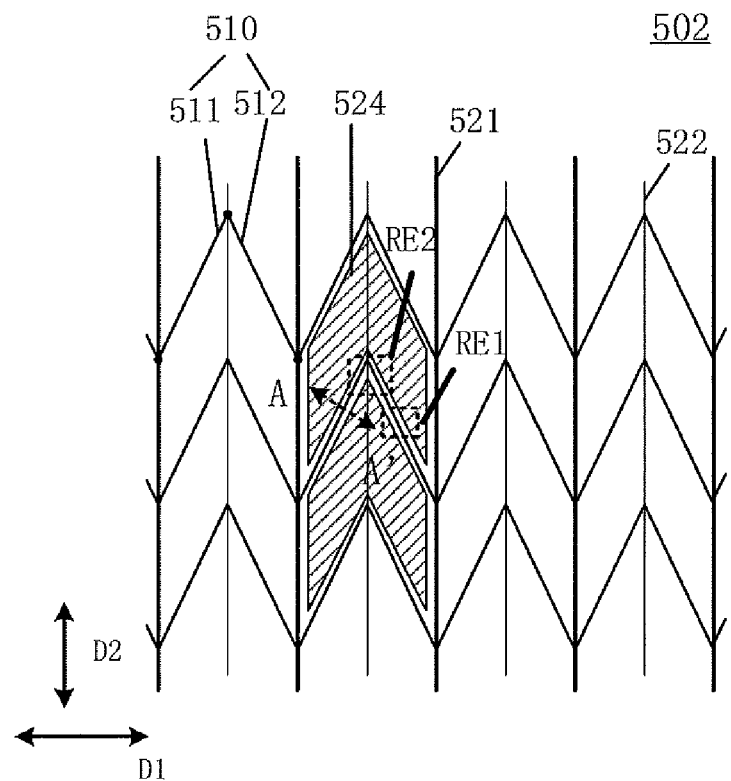
FIG. 3A is another schematic plane view of the light control panel shown in FIG. 1C.
Figure 3B:
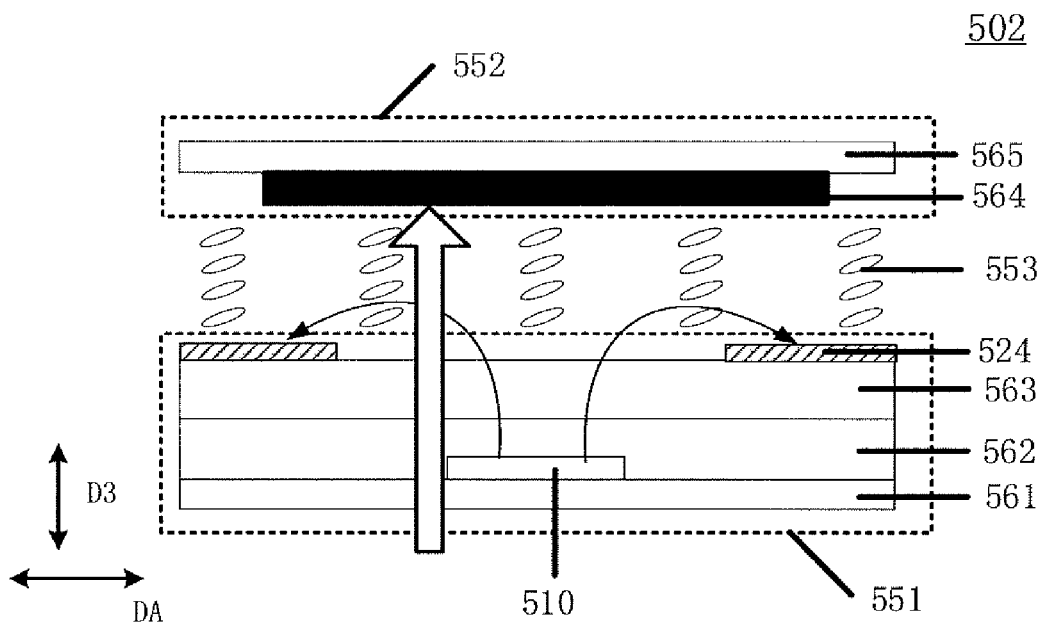
FIG. 3B is a schematic cross-sectional view of the light control panel shown in FIG. 1C and FIG. 3A.

FIG. 3A illustrates another schematic plane view of the light control panel 502 (the array substrate 551 of the light control panel 502) shown in FIG. 1C. Compared with FIG. 1C, FIG. 3A illustrates the pixel electrode included in the light control pixel unit. FIG. 3B illustrates a schematic cross-sectional view of the light control panel 502 shown in FIG. 1C and FIG. 3A, and the schematic cross-sectional view shown in FIG. 3B corresponds to the AA' line shown in FIG. 3A.

As shown in FIG. 3A and FIG. 3B, the light control panel 502 includes an array substrate 551 and an opposite substrate 552, which are opposite to each other, and a liquid crystal layer 553 sandwiched between the array substrate 551 and the opposite substrate 552. The light incident on the light control panel 502 may be incident into the light control panel 502 from the array substrate 551 and may leave the light control panel 502 from the opposite substrate 552. As shown in FIG. 3B, the opposite substrate 552 includes a black matrix unit 564 and a second base substrate 565.

As shown in FIG. 3A and FIG. 3B, the array substrate 551 includes a data line layer, and a first base substrate 561, a first electrode layer, an insulation layer (for example, including a first insulation layer 562 or a second insulation layer 563), and a second electrode layer arranged in sequence; the first electrode layer includes a plurality of gate lines 510, and each of the gate lines 510 integrally extends along the first direction D1; the data line layer includes a plurality of data lines 521, each of the data lines 521 integrally extends along a second direction D2 crossing with the first direction D1; the gate lines 510 and the data lines 521 cross each other to define a plurality of light control pixel units 523; the second electrode layer includes a plurality of pixel electrodes 524 arranged in an array, and each of the pixel electrodes 524 is arranged in a plurality of light control pixel units 523.

As shown in FIG. 3A and FIG. 3B, the orthographic projection of the pixel electrode 524 on the first electrode layer does not overlap with the gate line 510, and the electric field formed by the pixel electrode 524 and the gate line 510 enters the liquid crystal layer 553 located on a side of the pixel electrode 524 away from the gate line 510. Because a voltage difference between the pixel electrode 524 and the gate line 510 still exists in the dark state (that is, the light control unit where the light control pixel unit 523 driven by the gate line 510 is located is in a theoretically opaque state), the electric field formed by the pixel electrode 524 and the gate line 510 makes the liquid crystal molecules near the gate line 510 deviate from the predetermined orientation in the dark state, and makes the liquid crystal molecules near the gate line 510 allow part of the light that is incident on the light control panel 502 to pass through the region of the liquid crystal layer 553 corresponding to the gate line 510 and to enter the opposite substrate 552 in the dark state. If the width of the black matrix unit 564 included in the opposite substrate 552 is equal to the width of the corresponding gate line 510, the above-mentioned light passes through the region of the liquid crystal layer 553 corresponding to the gate line 510 and is incident on the opposite substrate 552, and then passes through the opposite substrate 552 and leaves the light control panel 502. In this case, the region, which corresponds to and nears the gate line 510, of the light control panel 502 will have the problem of light leakage in the dark state. In order to avoid the above-mentioned problem of light leakage of the light control panel 502 in the dark state, the width of the black matrix unit 564 is larger than the width of the corresponding gate line 510.

Figure 3C:
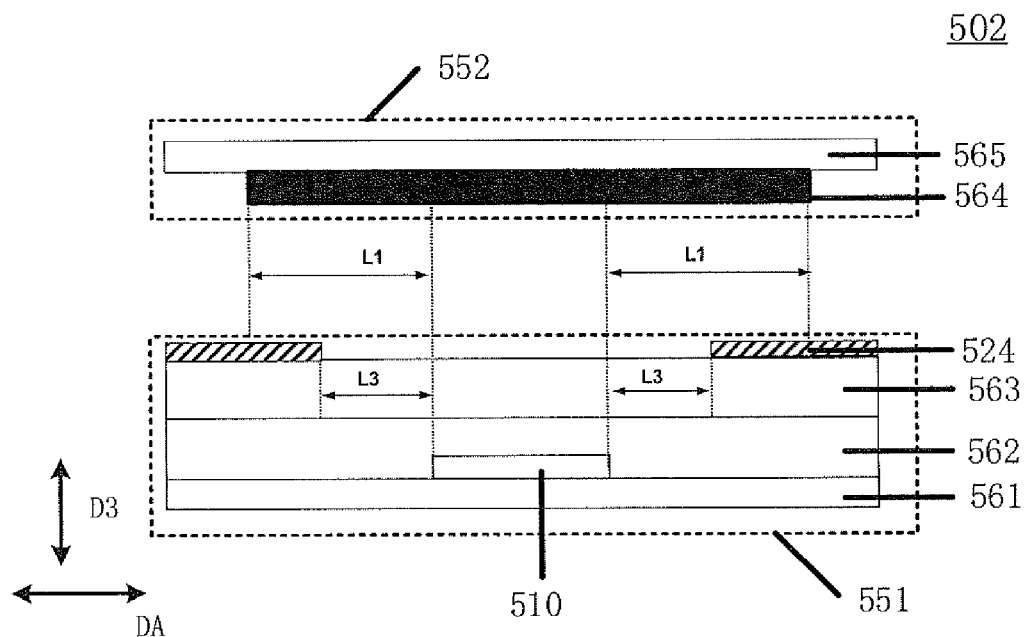
FIG. 3C is another schematic cross-sectional view of the light control panel shown in FIG. 3B.

FIG. 3C is another schematic cross-sectional view of the light control panel 502 shown in FIG. 3B. As shown in FIG. 3C, the distance L3 between the orthographic projection of the gate line 510 on the first electrode layer and the orthographic projection of the corresponding pixel electrode 524 on the first electrode layer in a fourth direction DA (i.e., the direction perpendicular to the extension direction of the trace portion of the gate line 510) may be equal to 6-10 microns (e.g., 8 microns). The distance L1 between one of the sides, which are opposite in the fourth direction DA, of the gate line 510 and one of the sides, which are opposite in the fourth direction DA, of the orthographic projection of the black matrix unit 564 on the first electrode layer may be equal to 18-22 microns (e.g., 20 microns). The difference between the width of the black matrix unit 564 in the fourth direction DA and the width of the corresponding gate line 510 in the fourth direction DA may be equal to 2*L1. For example, the width of the black matrix unit 564 in the fourth direction DA may be equal to 52-60 microns (e.g., 56 microns), the width of the gate line 510 in the fourth direction DA may be equal to 12-20 microns (e.g., 16 microns).

For example, because the width of the black matrix unit 564 is relatively large, the areas of the overlapping regions between the gate line 510 (or the black matrix unit 564) of the light control panel 502 and the display sub-pixels of different colors of the display panel 501 are quite different, the regions of the gate line 510 (or the black matrix unit 564) corresponding to the display sub-pixels of different colors have a great difference in the shielding of the light emitted by the backlight unit. Therefore, the difference in the intensity of the light emitted by the backlight unit 503 and incident on the display sub-pixels of different colors of the display panel 503 is relatively large, and the rainbow pattern problem of the display device including the light control panel 502 is more serious.

Figure 4A:
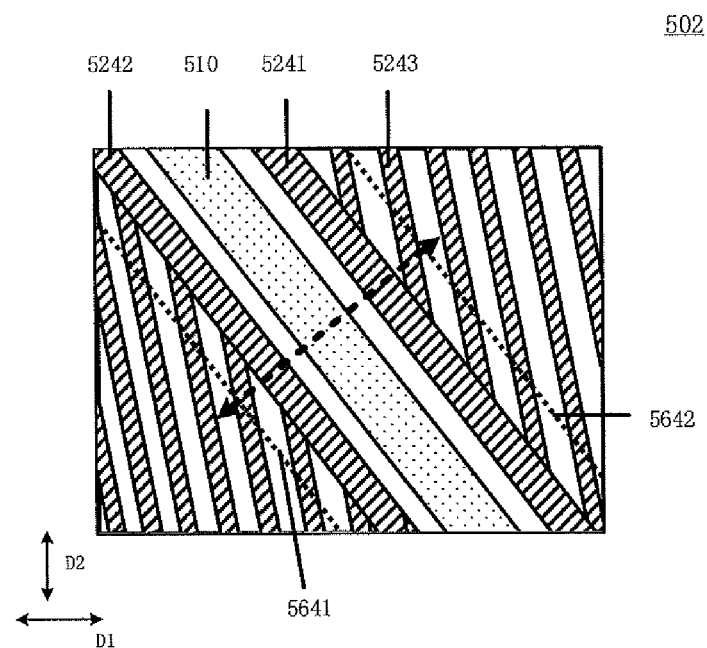
FIG. 4A is an enlarged schematic plane view of a first region of the light control panel shown in FIG. 3A.
Figure 4B:
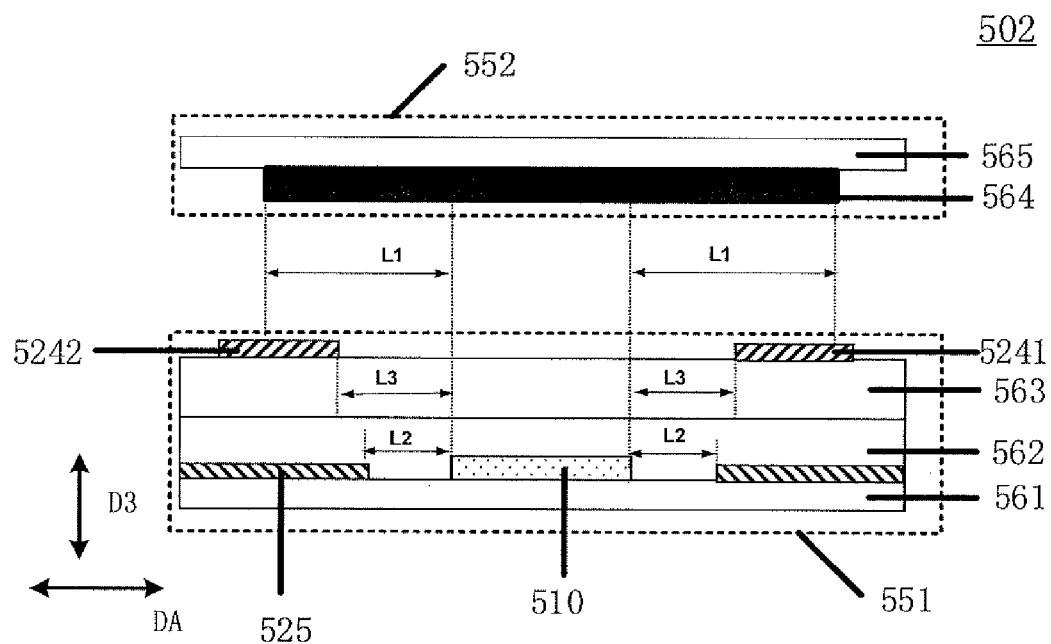
FIG. 4B is a schematic cross-sectional view of the first region of the light control panel shown in FIG. 4A.

FIG. 4A is an enlarged schematic plane view of the first region RE1 of the light control panel 502 shown in FIG. 3A. FIG. 4B is a schematic cross-sectional view of the light control panel 502 shown in FIG. 4A, and the schematic cross-sectional view shown in FIG. 4B corresponds to the dashed line with arrows shown in FIG. 4A. It should be noted that, for convenience of description, FIG. 4B also shows a common electrode 525 included in the light control pixel unit 523.

As shown in FIG. 4A and FIG. 4B, the pixel electrode 524 may include a plurality of strip electrodes 5243 arranged side by side in the first direction D1, and a first connection sub-electrode 5241 and a second connection sub-electrode 5242 that serve as two sides, which are opposite in the second direction D2, of the pixel electrode 524, that is, the pixel electrode 524 may be implemented as a slit electrode. It should be noted that the first connection sub-electrode 5241 and the second connection sub-electrode 5242 shown in FIG. 4A and FIG. 4B belong to two pixel electrodes 524 adjacent in the second direction D2, respectively. As shown in FIG. 4B, the common electrode 525 is a plate electrode, and the distance L2 between the common electrode 525 and the corresponding gate line 510 in the fourth direction DA may be equal to 6-10 microns (for example, 7.5 microns). For example, the distance L3 between the orthographic projection of the gate line 510 on the first electrode layer and the orthographic projection of the corresponding pixel electrode 524 (first connection sub-electrode 5241 or second connection sub-electrode 5242) on the first electrode layer in the fourth direction DA is larger than the distance L2 between the common electrode 525 and the corresponding gate line 510 in the fourth direction DA, so that part of the common electrode 525 is exposed from the space between the orthographic projection of the first connection sub-electrode 5241 on the first electrode layer and the orthographic projection of the second connection sub-electrode 5242 on the first electrode layer.

As shown in FIG. 4A, the gate line 510 is located within the gap formed by two sides 5641 and 5642, which are opposite in the fourth direction (perpendicular to the extension direction of the black matrix unit 564), of the orthographic projection of the black matrix unit 564 on the first electrode layer, that is, the gate line 510 is located within the orthographic projection of the black matrix unit 564 on the first electrode layer.

Figure 4C:
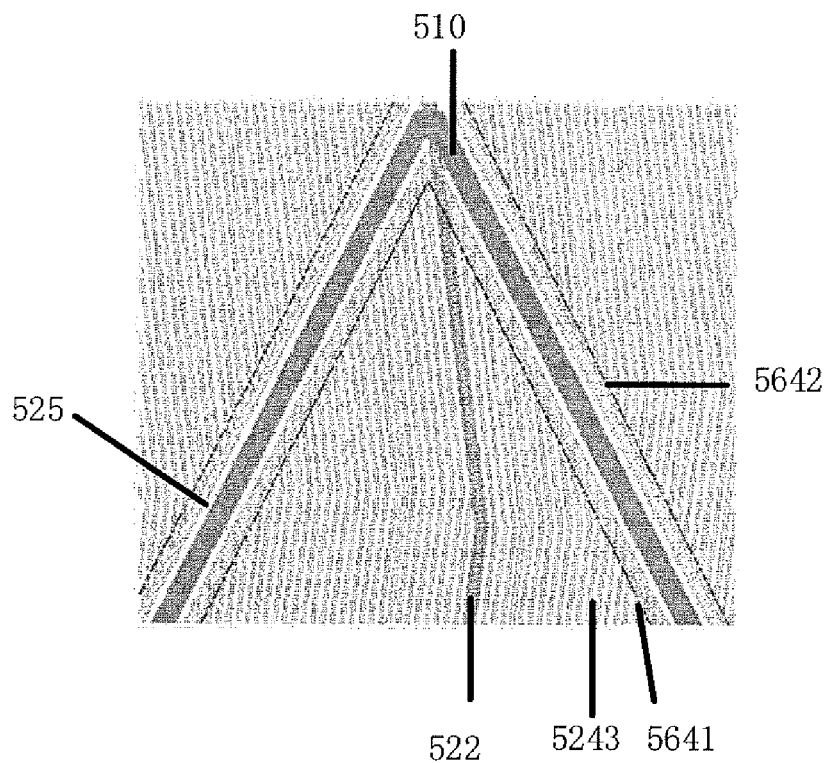
FIG. 4C is an enlarged schematic plane view of a second region of the light control panel shown in FIG. 3A.

FIG. 4C is an enlarged schematic plane view of a local region of another light control panel. As shown in FIG. 4C, a plurality of common electrode lines 522 are not limited to being implemented as straight lines parallel to the second direction D2, and may also include broken line structures.

At least one embodiment of the present disclosure provides an array substrate, a light control panel, and a display device. The array substrate includes a data line layer, and a base substrate, a first electrode layer, an insulation layer, and a second electrode layer, which are arranged in sequence. The first electrode layer includes a plurality of gate lines, each of the plurality of gate lines integrally extends along a first direction, and includes a plurality of first broken line structures directly connected in sequence in the first direction. The data line layer comprises a plurality of data lines, each of the plurality of data lines integrally extends along a second direction crossing with the first direction; the gate lines and the data lines cross each other to define a plurality of light control pixel units; the second electrode layer includes a plurality of common electrodes arranged in an array, each of the plurality of common electrodes is provided in at least one of the light control pixel units; at least one of the plurality of gate lines at least partially overlaps with an orthographic projection of at least one of the plurality of common electrodes on the first electrode layer. The array substrate can prevent the electric field formed by the gate line and the common electrode from entering the side of the second electrode layer away from the first electrode layer by making at least one of the gate lines at least partially overlap with an orthographic projection of at least one common electrode on the first electrode layer.

At least one embodiment of the present disclosure also provides a light control panel. The light control panel includes an opposite substrate, a liquid crystal layer, and an array substrate provided by at least one embodiment of the present disclosure. The array substrate and the opposite substrate are opposite to each other, and the liquid crystal layer is sandwiched between the array substrate and the opposite substrate.

For example, by making at least one of the plurality of gate lines of the array substrate of the light control panel at least partially overlap with an orthographic projection of at least one common electrode on the first electrode layer, the light control panel has the ability to suppress (e.g., completely suppress) the dark state light leakage problem of the light control panel and suppress the rainbow pattern problem of the display device including the light control panel in a case where a black matrix layer is not provided or the size of the black matrix unit of the black matrix layer is reduced.

The array substrate and the light control panel provided according to the embodiments of the present disclosure will be described in a non-limiting manner by several examples and embodiments. As described below, different features in these specific examples and embodiments may be combined with each other in the case of not conflicting with each other, so as to obtain new examples and embodiments, and these new examples and embodiments also belong to the protection scope of the present disclosure.

Figure 5:
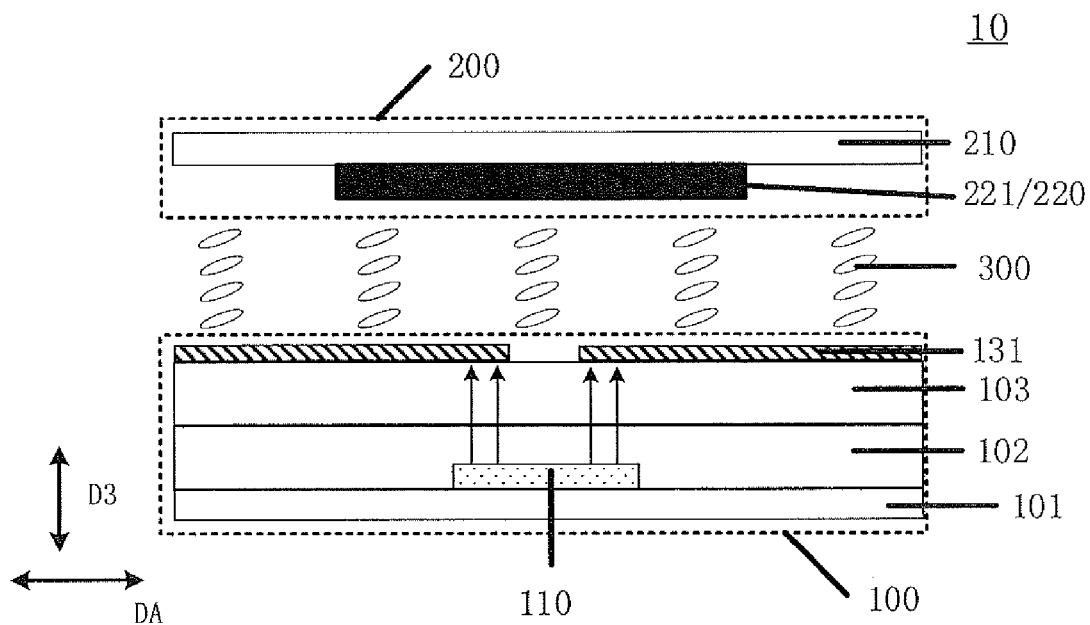
FIG. 5 is a schematic cross-sectional view of a light control panel according to at least one embodiment of the present disclosure.

FIG. 5 is a schematic cross-sectional view of a light control panel 10 according to at least one embodiment of the present disclosure. As shown in FIG. 5, the light control panel 10 includes an array substrate 100 and an opposite substrate 200, which are opposite to each other in a third direction D3, and a liquid crystal layer 300 sandwiched between the array substrate 100 and the opposite substrate 200.

As shown in FIG. 5, the array substrate 100 includes a data line layer (not shown in FIG. 5), and a first base substrate 101, a first electrode layer, an insulation layer (for example, the insulation layer may be the first insulation layer 102 or the second insulation layer 103), and a second electrode layer, which are arranged in sequence (sequentially arranged in the third direction D3), compared to the first base substrate 101, the second electrode layer is closer to the liquid crystal layer 300.

As shown in FIG. 5, the opposite substrate 200 includes a second base substrate 210 and a black matrix layer 220. For example, the black matrix layer 220 is closer to the liquid crystal layer 300 than the second base substrate 210; the black matrix layer 220 includes a plurality of black matrix units 221 integrally extending along the first direction D1.

Figure 6A:
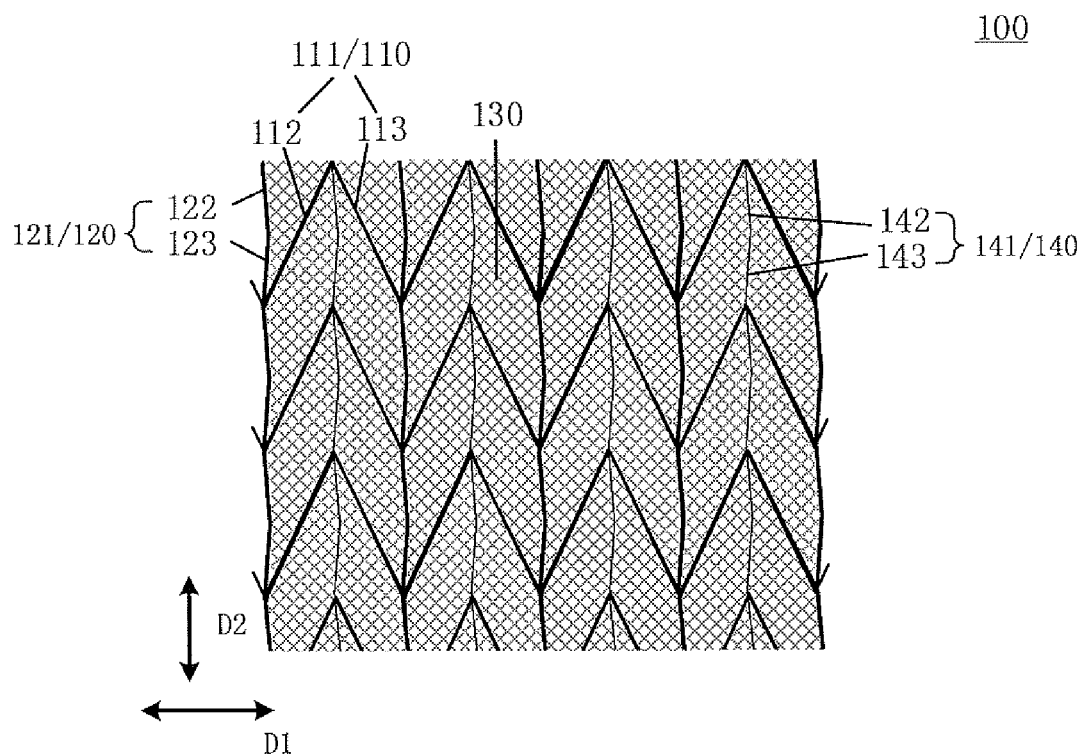
FIG. 6A is a schematic plane view of an array substrate of the light control panel shown in FIG. 5.

FIG. 6A is a schematic plane view of the array substrate 100 of the light control panel 10 shown in FIG. 5. As shown in FIG. 5 and FIG. 6A, the first electrode layer includes a plurality of gate lines 110, each of the plurality of gate lines 110 integrally extends along the first direction D1 and includes a plurality of first broken line structures 111 directly connected in sequence in the first direction D1. The data line layer (not labeled in FIG. 6A) includes a plurality of data lines 120, each of the plurality of data lines 120 integrally extends along the second direction D2; the gate lines 110 and the data lines 120 cross each other to define a plurality of light control pixel units 130. For example, the first direction D1, the second direction D2, and the third direction D3 cross each other (e.g., perpendicular to each other).

For example, the light control panel 10 may include a plurality of light control units arranged in an array, and a plurality of light control pixel units 130 included in the array substrate 100 are arranged in corresponding light control units, respectively. For example, the light control unit further includes a portion of the liquid crystal layer overlapping with the light control pixel unit 130 in the third direction D3 and a portion of the opposite substrate overlapping with the light control pixel unit 130 in the third direction D3. For example, the light control panel can adjust the transmissivity of each light control unit of the light control panel based on the received data signals. Therefore, the light control unit of the light control panel may be used to control the intensity of light incident on the display sub-pixel unit of the display panel corresponding to the light control unit, so that the light control panel may be used to provide adjusted backlight to the display panel of the display device including the light control panel.

For example, as shown in FIG. 5 and FIG. 6A, each of the data lines 120 includes a plurality of second broken line structures 121, and these second broken line structures 121 are connected directly in sequence in the second direction D2. It should be noted that, the fact that each of the gate lines 110 integrally extends along the first direction D1 only defines the extension direction of the gate line 110, but does not mean that the traces included in the gate line 110 are parallel to the first direction D1 everywhere. For example, the gate line 110 includes line segments (e.g., straight line segments), the number of which is a first number (greater than or equal to 2), and some of the line segments may cross the first direction D1. Accordingly, the fact that each of the data lines 120 integrally extends along the second direction D2 only defines the extension direction of the data line 110, but does not mean that the traces included in the data line 120 are parallel to the second direction D2 everywhere.

For example, the first broken line structures 111 included in the gate lines 110 are in one-to-one correspondence to the light control pixel units 130, and the second broken line structures 121 included in the data lines 120 are in one-to-one correspondence to the light control pixel units 130. For example, each of the light control pixel units 130 partially overlaps with the corresponding gate line 110. For example, each of the light control pixel units 130 partially overlaps with the corresponding data line 120.

Figure 6B:
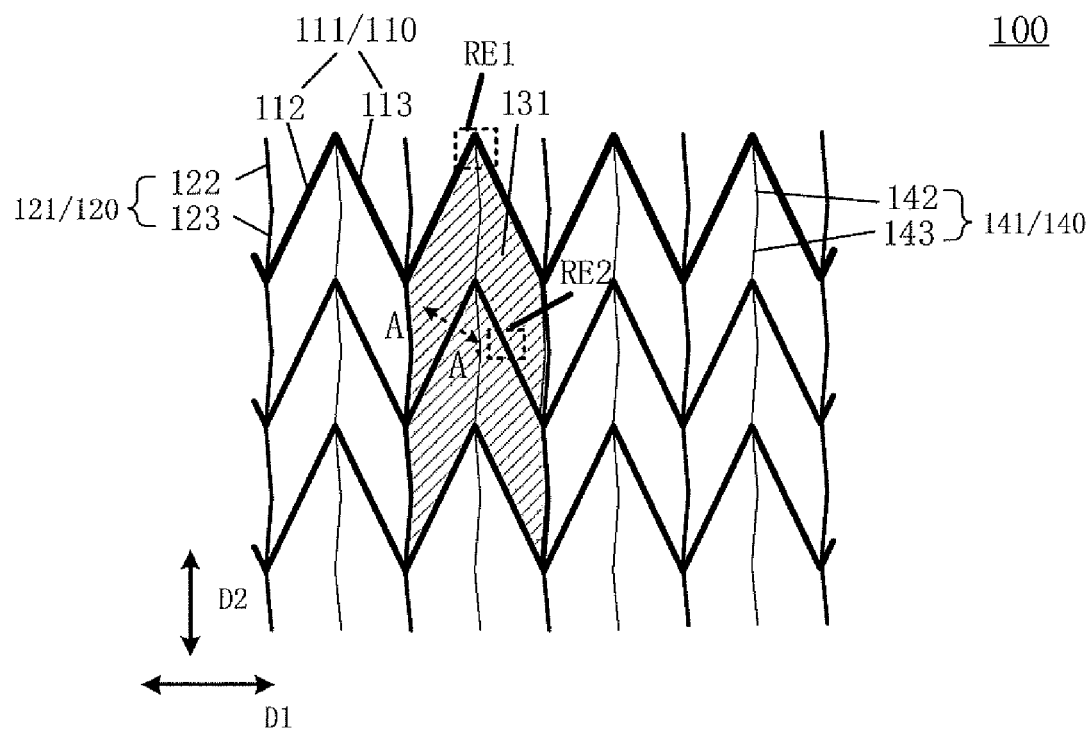
FIG. 6B is another schematic plane view of the array substrate shown in FIG. 6A.

FIG. 6B is another schematic plane view of the array substrate 100 shown in FIG. 6A. Compared with FIG. 6A, FIG. 6B illustrates the common electrode 131 included in the light control pixel unit 130, and the schematic cross-sectional view shown in FIG. 5 corresponds to the line AA' shown in FIG. 6B. As shown in FIG. 5, FIG. 6A, and FIG. 6B, the second electrode layer includes a plurality of common electrodes 131 arranged in an array, and each of the common electrodes 131 is provided in at least one of the light control pixel units 130. For example, the common electrodes 131 are in one-to-one correspondence to the light control pixel units 130, and each of the common electrodes 131 is disposed (e.g., completely located) in the corresponding light control pixel unit 130.

As shown in FIG. 5 and FIG. 6B, at least one of the gate lines 110 at least partially overlaps with the orthographic projection of at least one common electrode 131 on the first electrode layer. For example, each of the gate lines 110 at least partially overlaps with the orthographic projection of each common electrode 131 on the first electrode layer, and here, the common electrode 131 is located in one or two rows of common electrodes 131 adjacent to the gate line 110 in the second direction D2.

For example, the size of the overlapping region between the gate line 110 and the orthographic projection of the corresponding common electrode 131 on the first electrode layer can be set according to the actual application requirements (e.g., according to the requirements of the light control panel and the display device for capacitance), and the embodiments of the present disclosure do not specifically limit this. For example, for a 65-inch display device, the overall size of the overlapping region between the gate line 110 and the orthographic projection of the corresponding common electrode 131 on the first electrode layer may be greater than 0 and less than or equal to G_WL, where G_WL is the width of the gate line 110. For example, in a case where the orthographic projections of two common electrodes 131 on the first electrode layer overlaps with the gate line 110, the overall size refers to the sum of the size of the overlapping region between the gate line 110 and the orthographic projection of one of the two common electrodes 131 on the first electrode layer and the size of the overlapping region between the gate line 110 and the orthographic projection of the other of the two common electrodes 131 on the first electrode layer.

Figure 7A:
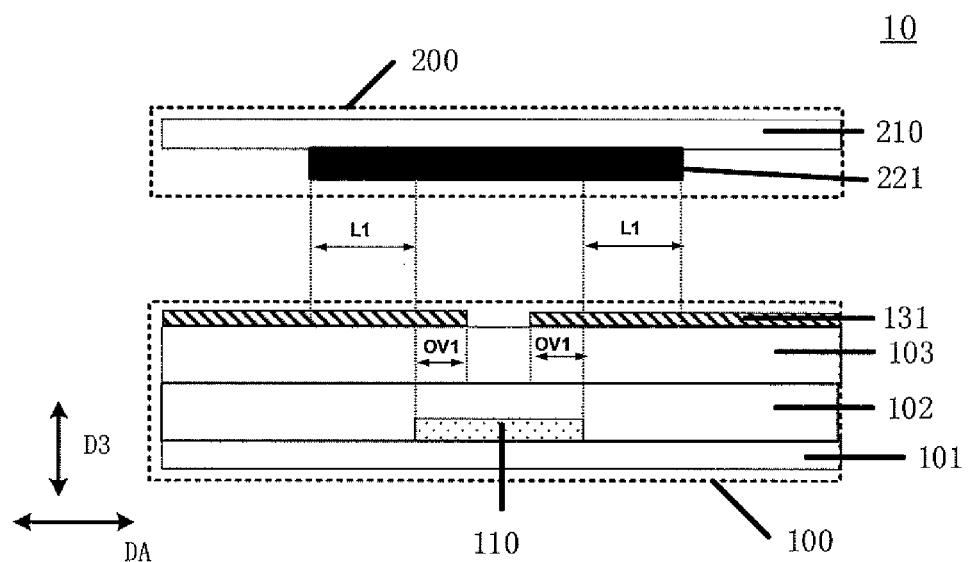
FIG. 7A is another schematic cross-sectional view of the light control panel shown in FIG. 5.

FIG. 7A is another schematic cross-sectional view of the light control panel 10 shown in FIG. 5. For example, the gate line 110 slightly overlaps with the orthographic projection of the corresponding common electrode 131 on the first electrode layer, thus preventing the electric field formed by the gate line 110 and the common electrode 131 overlapping with the gate line 110 from entering a side of the second electrode layer away from the first electrode layer. For example, as shown in FIG. 5 and FIG. 7A, the above-mentioned "slightly overlaps" means that, the width OV1 of the region where the gate line 110 overlaps with the orthographic projection of the corresponding common electrode 131 on the first electrode layer in the fourth direction DA is greater than 0 and less than 1 micron. It should be noted that the fourth direction DA refers to the direction perpendicular to the extension direction of a certain line segment of the gate line 110. Because the extension directions of a plurality of line segments included in the gate line 110 are not completely the same, the fourth directions DA corresponding to different line segments of the gate line 110 may be different.

For example, the width OV1 of the region where the gate line 110 overlaps with the orthographic projection of the corresponding common electrode 131 on the first electrode layer in the fourth direction DA (i.e., the direction perpendicular to the extension direction of the gate line 110) may be between 3 microns and 7 microns (4 microns, 5 microns, or 6 microns). For example, by making the width OV1 of the region where the gate line 110 overlaps with the orthographic projection of the corresponding common electrode 131 on the first electrode layer in the fourth direction DA be between 3 microns and 7 microns (4 microns, 5 microns, or 6 microns), the problem that the gate line 110 and the orthographic projection of the corresponding common electrode 131 on the first electrode layer may not overlap in actual products due to the potential alignment error between the gate line 110 and the corresponding common electrode 131 can be avoided, and the problem that the charging time required for the gate line 110 and the corresponding common electrode 131 is relatively long due to the excessive capacitance between the gate line 110 and the corresponding common electrode 131 can also be avoided.

For example, by making at least one of the gate lines 110 at least partially overlap with the orthographic projection of at least one common electrode 131 on the first electrode layer, the array substrate 100 can prevent the electric field formed by the gate line 110 and the common electrode 131 overlapping with the gate line 110 from entering the side of the second electrode layer away from the first electrode layer (for example, entering the liquid crystal layer 300 located on the side of the second electrode layer away from the first electrode layer). Therefore, although in the dark state (that is, the light control unit where the light control pixel unit 130 driven by the gate line 110 is located is in a theoretically opaque state), a voltage difference between the common electrode 131 and the gate line 110 still exists, the electric field formed by the common electrode 131 and the gate line 110 cannot make the liquid crystal molecules near the gate line 110 deviate from the predetermined orientation in the dark state, so that the light control panel 10 including the array substrate 100 has the ability to suppress the dark state light leakage problem of the light control panel 10 in the case of not providing the black matrix layer 220 or reducing the size of the black matrix unit 221 of the black matrix layer 220.

For example, the gate line 110 may be made of a metal material (e.g., copper, aluminum, or an aluminum alloy). For example, as shown in FIG. 7A, the orthographic projections of the gate lines 110 on the black matrix layer 220 are located in the corresponding black matrix units 221, respectively. For example, each of the black matrix units 221 includes a plurality of first black matrix structures (not labeled in the figure), and the first black matrix structures are directly connected in sequence in the first direction D1. The orthographic projections of the first broken line structures 111 included in the gate lines 110 on the black matrix layer 220 are located in the corresponding first black matrix structures, respectively.

For example, the extension trend of each first black matrix structure is the same as that of the corresponding first broken line structure 11. It should be noted that, "the extension trend of each first black matrix structure is the same as that of the corresponding first broken line structure 11" means that each of the first black matrix structures has black matrix sub-structures, the number of which is a first number, and the extension direction of each black matrix sub-structure of each first black matrix structure is the same as that of a corresponding line segment of the corresponding first broken line structure 111.

For example, the orthographic projections of the gate lines 110 on the black matrix layer 220 are located in the corresponding black matrix units 221, respectively, so that the black matrix units 221 can be used to suppress the light reflection of the gate lines 110. For example, the width of the black matrix unit 221 in the fourth direction DA may be equal to the width of the corresponding gate line 110 in the fourth direction DA. For another example, the width of the black matrix unit 221 in the fourth direction DA may be greater than the width of the corresponding gate line 110 in the fourth direction DA, so that the orthographic projections of the gate lines 110 on the black matrix layer 220 can still be respectively located in the corresponding black matrix units 221 in a case where an alignment error between the black matrix unit 221 and the gate line 110 exists, thereby improving the suppression effect of the black matrix unit 221 on the light reflection of the gate line 110.

For example, the width of the black matrix unit 221 in the fourth direction DA may be set according to actual application requirements, and is not specifically limited by the embodiments of the present disclosure. For example, the ratio of the width of each of the black matrix units 221 to the width of the corresponding gate line 110 is between 1 and 2.5 (e.g., 2). For example, as shown in FIG. 7A, the difference between the width of the black matrix unit 221 in the fourth direction DA and the width of the corresponding gate line 110 in the fourth direction DA is equal to 2*L1, and the distance L1 between one of the sides, which are opposite in the fourth direction DA, of the gate line 110 and one of the sides, which are opposite in the fourth direction DA, of the orthographic projection of the corresponding black matrix unit 221 on the first electrode layer may be equal to 6-10 microns (e.g., 8 microns). For example, the width of the black matrix unit 221 in the fourth direction DA may be equal to 28-36 microns (e.g., 32 microns), and the width of the gate line 110 in the fourth direction DA may be equal to 12-20 microns (e.g., 16 microns).

For example, compared with the light control panels shown in FIG. 3B and FIG. 4B, by reducing the size of the black matrix unit 221 of the black matrix layer 220, the light control panel 10 shown in FIG. 5 can reduce the difference in the areas of the overlapping regions between the black matrix units 221 of the light control panel 10 and display sub-pixels of different colors of the display panel (the display panel of the display device that includes the light control panel 10), and can reduce the difference in blocking the light, which is emitted by the backlight unit, by regions of black matrix units 221 corresponding to the display sub-pixels of different colors. Accordingly, the difference in the intensity of the light emitted from the backlight unit (the backlight unit of the display device including the light control panel 10) and incident on the display sub-pixels of different colors of the display panel (the display panel of the display device including the light control panel 10) can be reduced, thus suppressing the rainbow pattern problem of the display device that includes the light control panel 10.

For example, the black matrix layer 220 further includes a plurality of second black matrix units 221, and each of the second black matrix units 221 integrally extends along the second direction D2; the orthographic projections of the data lines 120 on the black matrix layer 220 are located in the corresponding second black matrix units 221, respectively. For example, each of the second black matrix units 221 includes a plurality of second black matrix structures directly connected in sequence in the second direction D2, and the orthographic projections of the second broken line structures 121 included in the gate lines 110 on the black matrix layer 220 are located in the corresponding second black matrix structures, respectively.

Figure 7B:
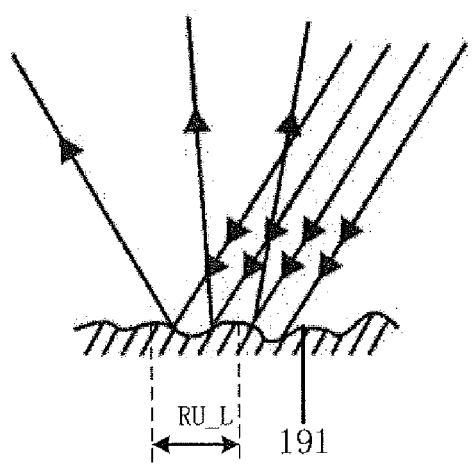
FIG. 7B is a schematic diagram of a surface of a side, which is close to a second electrode layer, of each of a plurality of gate lines of the array substrate according to at least one embodiment of the present disclosure.

It should be noted that in some examples, the opposite substrate 200 may not be provided with a black matrix layer. FIG. 7B is a schematic diagram of a surface of a side, which is close to a second electrode layer, of each of the plurality of gate lines of the array substrate according to at least one embodiment of the present disclosure. For example, as shown in FIG. 7B, the surface of the side, which is close to a second electrode layer, of each gate line is a diffuse reflection surface and has concave-convex structures 191 (that is, concave structures and convex structures). For example, the distance RU_L between two adjacent convex structures on the surface of the side, which is close to a second electrode layer, of each gate line 110 is less than 1 mm, and the distance between two adjacent concave structures on the surface of the side, which is close to a second electrode layer, of each gate line 110 is less than 1 mm.

For example, compared with the light control panel shown in FIG. 7A, by making the surface of the side, which is close to the second electrode layer, of each gate line 110 be a diffuse reflection surface and have concave-convex structures 191, so that the reflectivity of the gate lines 110 to the light incident on the surface of the side of each gate line 110 close to the second electrode layer is small. In this case, the opposite substrate 200 may not be provided with a black matrix layer. Therefore, the difference in the intensity of the light emitted from the backlight unit (the backlight unit of the display device including the light control panel 10) and incident on the display sub-pixels of different colors of the display panel (the display panel of the display device including the light control panel 10) can be further reduced, thus further suppressing the rainbow pattern problem of the display device that includes the light control panel 10.

For example, the width of the black matrix unit 221 may be greater than or equal to zero micron and less than or equal to 32 microns.

For example, as shown in FIG. 5 and FIG. 6B, the orthographic projections of two sides, which are opposite in the second direction D2, of each common electrode 131 on the first electrode layer overlap (e.g., partially overlap) with sides, which are close to each of the plurality of common electrodes 131, of the corresponding two gate lines 110, respectively. Therefore, the array substrate 100 can better prevent the electric field formed by the gate lines 110 and the common electrodes 131 overlapping with the gate lines 110 from entering the side of the second electrode layer away from the first electrode layer (for example, entering the liquid crystal layer 300 located on the side of the second electrode layer away from the first electrode layer).

For example, as shown in FIG. 5 and FIG. 6B, a space is provided between two common electrodes 131 adjacent in the second direction D2, and the gate line 110 overlapping with the orthographic projections of the two common electrodes 131 adjacent in the second direction D2 on the first electrode layer overlaps with the orthographic projection of the space on the first electrode layer. For example, the orthographic projection of the space on the first electrode layer is located (e.g., completely located) within the gate line 110 overlapping with the orthographic projections of the two common electrodes 131 adjacent in the second direction D2 on the first electrode layer.

For example, a space between two common electrodes 131 adjacent in the second direction D2 is provided, so that the capacitance between the gate line 110 and the corresponding common electrode 131 can be avoided from being too large, thereby avoiding the potential problem that the charging time required for the gate line 110 and the common electrode 131 is long. In other examples, there may be no space between two common electrodes 131 adjacent in the second direction D2, that is, the two common electrodes 131 adjacent in the second direction D2 may be in direct contact or the gate line 110 may be completely covered by the two common electrodes 131 adjacent in the second direction D2, thereby further improving the ability of the light control panel 10 to suppress light leakage in the dark state.

Figure 8A:
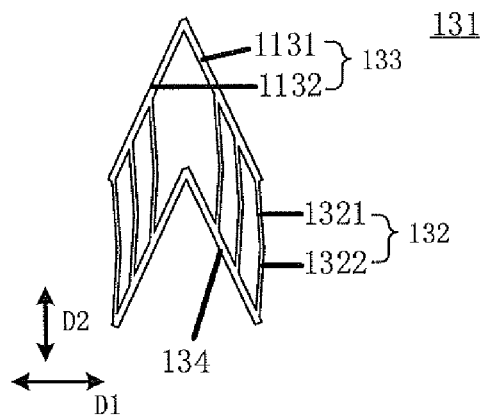
FIG. 8A is a schematic plane view of a common electrode according to at least one embodiment of the present disclosure.

For example, the specific shape of the common electrode 131 can be set according to actual application requirements, which is not specifically limited by the embodiments of the present disclosure. For example, the common electrode 131 may be a plate electrode or a slit electrode. FIG. 8A is a schematic plane view of the common electrode 131 provided by at least one embodiment of the present disclosure. As shown in FIG. 8A, the common electrode 131 includes a plurality of strip electrodes 132 arranged side by side in the first direction D1, and a first connection sub-electrode 133 and a second connection sub-electrode 134 that serve as two sides of each common electrode 131 that are opposite in the second direction D2; the first connection sub-electrode 133 is connected with the first ends of the strip electrodes 132, and the second connection sub-electrode 134 is connected with the second ends of the strip electrodes 132.

Figure 8B:
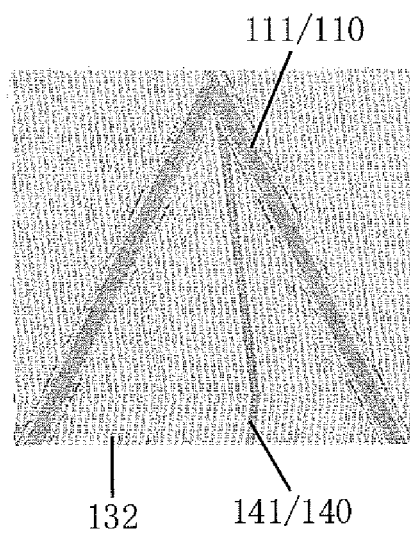
FIG. 8B is an enlarged view of the first region of the array substrate shown in FIG. 6B.
Figure 9A:
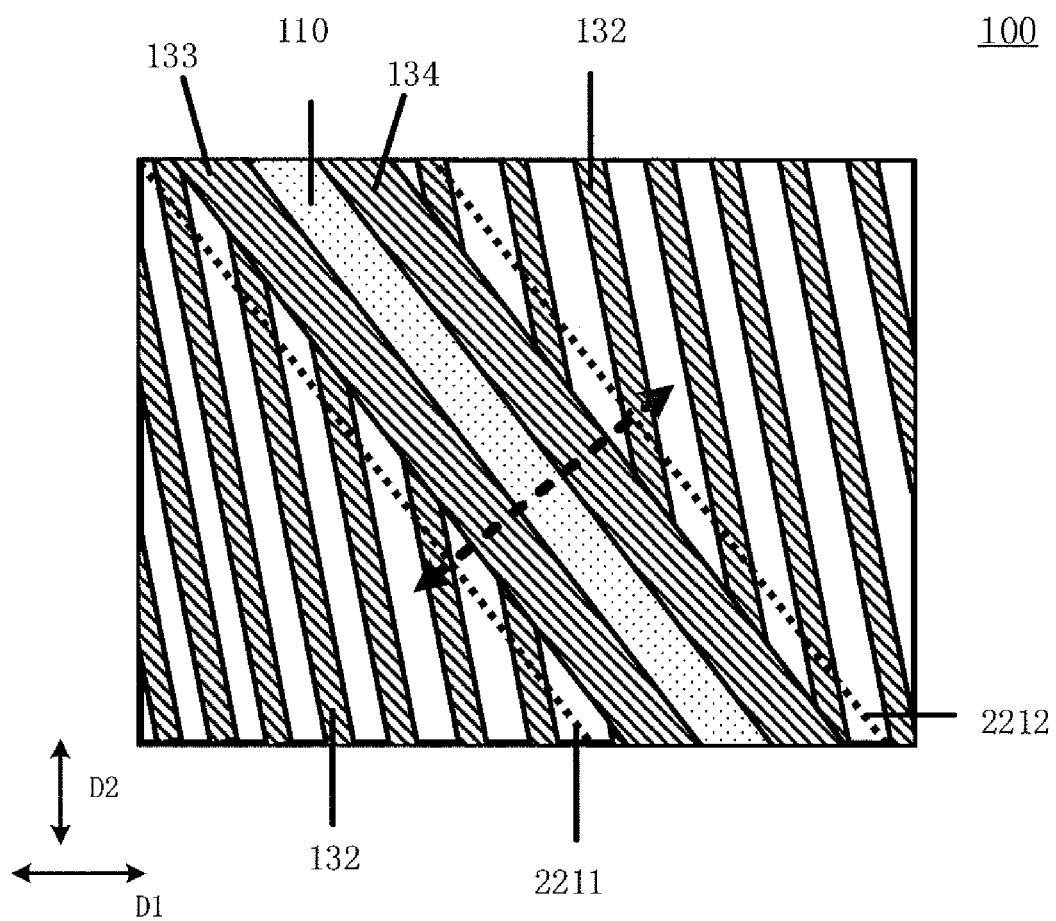
FIG. 9A is an enlarged view of the second region of the array substrate shown in FIG. 6B.
Figure 9B:
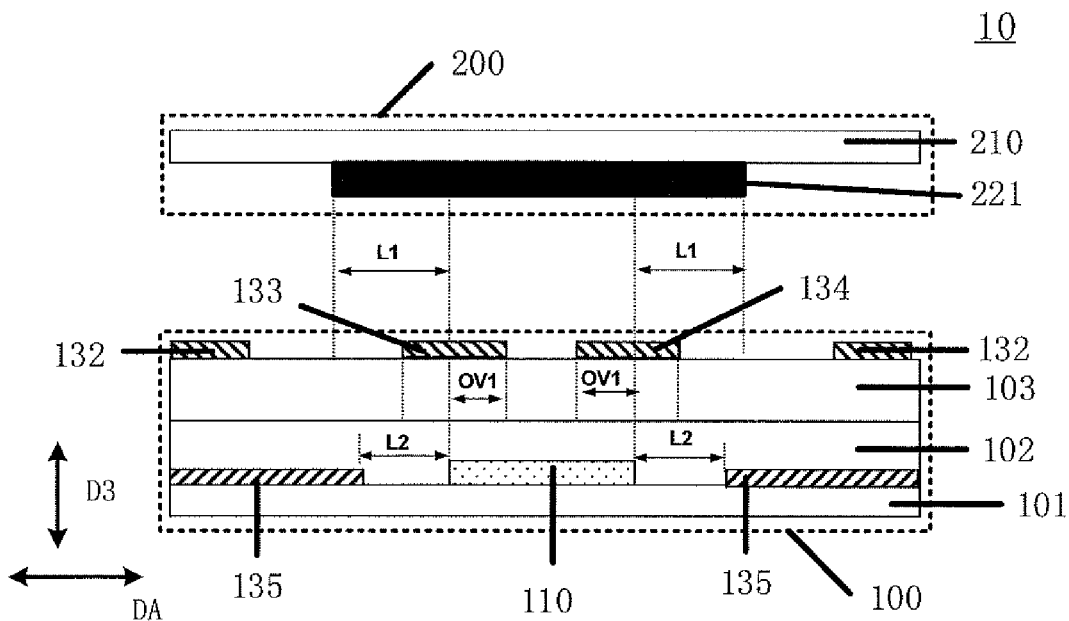
FIG. 9B is a schematic cross-sectional view of the second region of the array substrate shown in FIG. 9A.
Figure 10A:
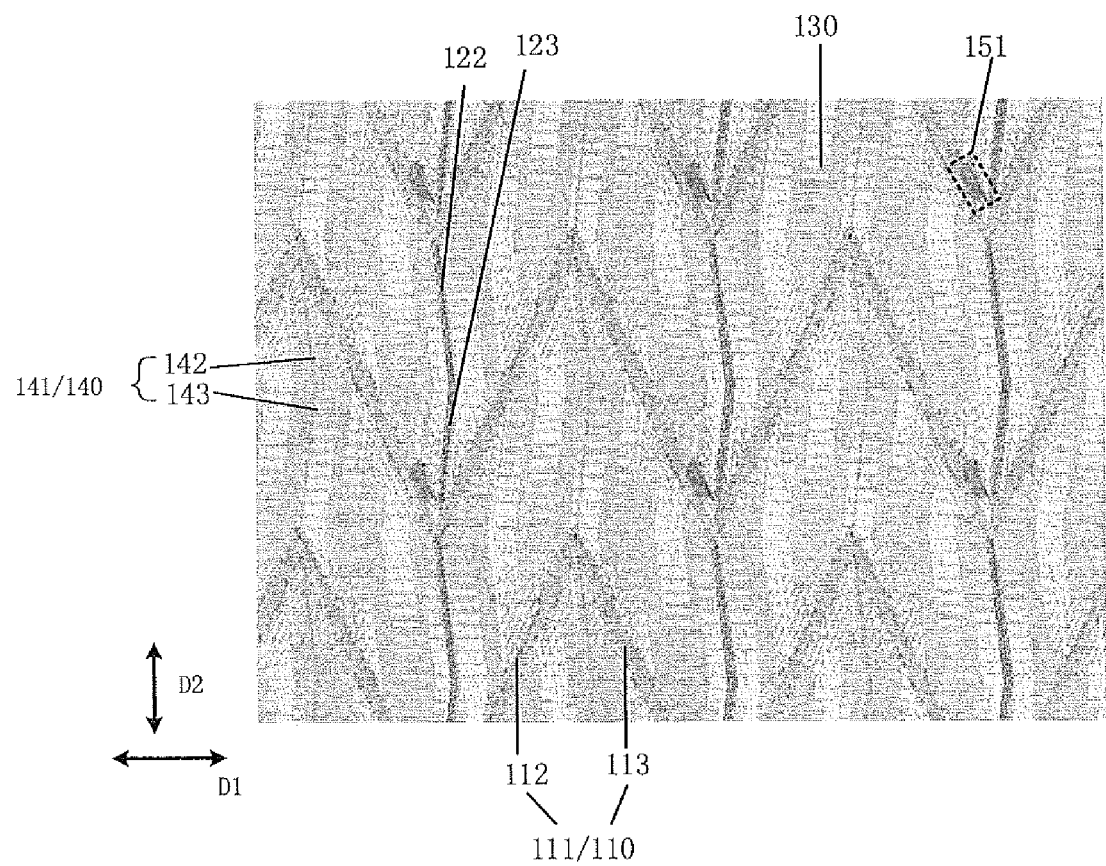
FIG. 10A is another schematic diagram of the array substrate shown in FIG. 6B.

FIG. 8B is an enlarged view of the first region RE1 of the array substrate 100 shown in FIG. 6B, FIG. 9A is an enlarged view of the second region RE2 of the array substrate 100 shown in FIG. 6B, FIG. 9B is a schematic cross-sectional view of the second region RE2 of the array substrate 100 shown in FIG. 9A, the schematic cross-sectional view shown in FIG. 9B corresponds to the broken line with arrows shown in FIG. 9A. FIG. 10A is another schematic diagram of the array substrate 100 shown in FIG. 6B. It should be noted that, for convenience of description, FIG. 9B also shows a pixel electrode 135 included in the light control pixel unit 130.

As shown in FIG. 8B, FIG. 9A, FIG. 9B, and FIG. 10A, the common electrode 131 includes a plurality of strip electrodes 132 arranged side by side in the first direction D1, and a first connection sub-electrode 133 and a second connection sub-electrode 134 that serve as two sides of each common electrode 131 that are opposite in the second direction D2; the first connection sub-electrode 133 is connected with the first ends of the strip electrodes 132, and the second connection sub-electrode 134 is connected with the second ends of the strip electrodes 132. The orthographic projection of the first connection sub-electrode 133 on the first electrode layer overlaps (for example, partially overlaps or completely overlaps) with the side, which is close to the first connection sub-electrode 133, of the corresponding gate line 110. The orthographic projection of the second connection sub-electrode 134 on the first electrode layer overlaps (for example, partially overlaps or completely overlaps) with the side, which is close to the second connection sub-electrode 134, of the corresponding gate line 110. For example, the orthographic projection of the first connection sub-electrode 133 (or second connection sub-electrode 134) on the first electrode layer completely overlaps with the side, which is close to the first connection sub-electrode 133 (or second connection sub-electrode 134), of the corresponding gate line 110, which means that the orthographic projection of the first connection sub-electrode 133 (or second connection sub-electrode 134) on the first electrode layer is located within the gate line 110.

It should be noted that the first connection sub-electrode 133 and the second connection sub-electrode 134 shown in FIG. 9A and FIG. 9B belong to two common electrodes 131 adjacent in the second direction D2, respectively. For example, there is a space between the first connection sub-electrode 133 and the second connection sub-electrode 134 shown in FIG. 9A and FIG. 9B, and the gate line 110 overlapping with the orthographic projections of the first connection sub-electrode 133 and the second connection sub-electrode 134 on the first electrode layer overlaps (for example, partially overlaps) with the orthographic projection of the space on the first electrode layer.

For example, as shown in FIG. 6B, FIG. 8A, FIG. 8B, and FIG. 9A, each of the first connection sub-electrode 133 and the second connection sub-electrode 134 has the same or similar shape as the corresponding first broken line structure 111 (the first broken line structure 111 of the gate lines 110 overlapping with each of the above-mentioned first connection sub-electrode 133 and the second connection sub-electrode 134 in the second direction D2). Each strip electrode 132 has the same or similar shape as the corresponding second broken line structure 121 (the second broken line structure 121 of the data lines 120 overlapping with each strip electrode 132 in the first direction D1).

For example, each of the first connection sub-electrode 133 and the second connection sub-electrode 134 has the same extension trend as the corresponding region of the gate lines 110 in the first direction D1, the corresponding region of the gate lines 110 are the regions of the gate lines that overlap with each of the first connection sub-electrode 133 and the second connection sub-electrode 134 in the second direction D2 (i.e., the first broken line structures 111 of the gate lines 110 overlapping with each of the first connection sub-electrode 133 and the second connection sub-electrode 134 in the second direction D2). The strip electrodes 132 have the same extension trend as the corresponding regions of the data lines 120 in the second direction D2, the corresponding regions of the data lines 120 are the regions of the data lines that overlap with the strip electrodes 132 in the first direction D1 (i.e., the second broken line structures 121 of the data lines 120 overlapping with each strip electrode in the first direction D1).

It should be noted that each of the first connection sub-electrode 133 and the second connection sub-electrode 134 has the same extension trend as the corresponding regions of the gate lines 110 in the first direction D1, which means that each of the first connection sub-electrode 133 and the second connection sub-electrode 134 has a first number of electrode segments, and the extension direction of each electrode segment of each of the first connection sub-electrode 133 and the second connection sub-electrode is the same as that of the corresponding line segment of the corresponding first broken line structure 111. The strip electrodes 132 have the same extension trend as the corresponding regions of the data lines 120 in the second direction D2, which means that each strip electrode has a second number of electrode segments (the second broken line structure 121 has a second number of line segments), the extension direction of each electrode segment of each strip electrode is the same as that of the corresponding line segment of the corresponding second broken line structure 121.

For example, as shown in FIG. 6B, FIG. 8A, FIG. 8B, FIG. 9A, and FIG. 10A, each of the first broken line structures 111 includes a first trace portion 112 (i.e., a line segment) and a second trace portion 113 directly connected in sequence. Each of the first trace portion 112 and the second trace portion 113 intersects both the first direction D1 and the second direction D2. Each of the first connection sub-electrode 133 and the second connection sub-electrode 134 includes a first electrode portion 1131 and a second electrode portion 1132 directly connected in sequence, and each of the first electrode portion (electrode segment) 1131 and the second electrode portion 1132 intersects both the first direction D1 and the second direction D2. For example, the extension direction of the first trace portion 112 and the extension direction of the second trace portion 113 are equal to the extension direction of the first electrode portion 1131 and the extension direction of the second electrode portion 1132, respectively. For example, the first electrode portion 1131 and the second electrode portion 1132 overlap with the first trace portion 112 and the second trace portion 113 in the second direction D2, respectively.

For example, as shown in FIG. 6B, FIG. 8A, FIG. 8B, FIG. 9A, and FIG. 10A, each of the second broken line structures 121 includes a third trace portion 122 and a fourth trace portion 123 directly connected in sequence, each of the third trace portion 122 and the fourth trace portion 123 intersects with both the first direction D1 and the second direction D2. Each of the strip electrodes 132 includes a third electrode portion 1321 and a fourth electrode portion 1322 directly connected in sequence, each of the third electrode portion 1321 and the fourth electrode portion 1322 intersects with both the first direction D1 and the second direction D2. For example, the extension direction of the third trace portion 122 and the extension direction of the fourth trace portion 123 are equal to the extension direction of the third electrode portion 1321 and the extension direction of the fourth electrode portion 1322, respectively. For example, the third electrode portion 1321 and the fourth electrode portion 1322 overlap with the third trace portion 122 and the fourth trace portion 123 in the first direction D1, respectively.

It should be noted that the first broken line structure 111 and the first connection sub-electrode 133 (or the second connection sub-electrode 134) of the array substrate 100 provided by at least one embodiment of the present disclosure are not limited to the structures shown in FIG. 6B and FIG. 8A. According to practical application requirements, the first broken line structure 111 and the first connection sub-electrode 133 (or the second connection sub-electrode 134) of the array substrate 100 provided by at least one embodiment of the present disclosure can also adopt the structure shown in FIG. 10B.

Figure 10B:
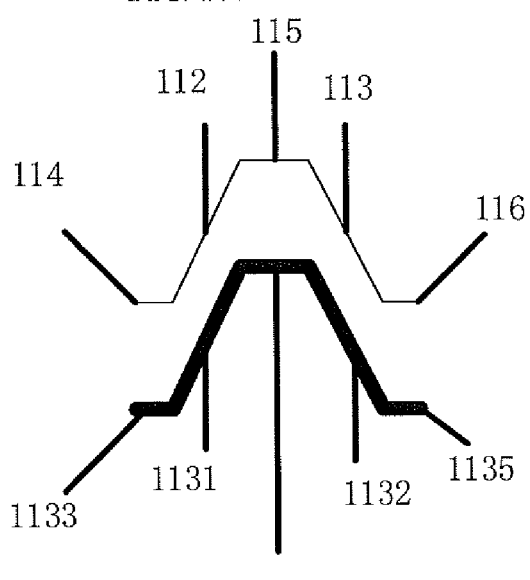
FIG. 10B is a schematic plane view of another first broken line structure and another first connection sub-electrode (or second connection sub-electrode) according to at least one embodiment of the present disclosure.

FIG. 10B is a schematic plane view of another first broken line structure 111 and another first connection sub-electrode 133 (or second connection sub-electrode 134) provided by at least one embodiment of the present disclosure. As shown in FIG. 10B, the first broken line structure 111 further includes a fifth trace portion 114, a sixth trace portion 115, and a seventh trace portion 116, and each of the first connection sub-electrode 133 and the second connection sub-electrode 134 further includes a fifth electrode portion 1133, a sixth electrode portion 1134, and a seventh electrode portion 1135.

For example, the extension direction of the fifth trace portion 114, the extension direction of the sixth trace portion 115, and the extension direction of the seventh trace portion 116 are equal to the extension direction of the fifth electrode portion 1133, the extension direction of the sixth electrode portion 1134, and the extension direction of the seventh electrode portion 1135, respectively. For example, each of the fifth trace portion 114, the sixth trace portion 115, the seventh trace portion 116, the fifth electrode portion 1133, the sixth electrode portion 1134, and the seventh electrode portion 1135 is parallel to the first direction D1.

For example, as shown in FIG. 10B, the fifth trace portion 114, the first trace portion 112, the sixth trace portion 115, the second trace portion 113, and the seventh trace portion 116 are sequentially connected in the first direction D1; the fifth electrode portion 1133, the first electrode portion 1131, the sixth electrode portion 1134, the second electrode portion 1132, and the seventh electrode portion 1135 are sequentially connected in the first direction D1. For example, the seventh trace portion 116 of each first broken line structure 111 is directly connected to the fifth trace portion 114 of the first broken line structure 111 located on the right side of the seventh trace portion 116, the seventh electrode portion 1135 of each first connection sub-electrode 133 (or second connection sub-electrode 134) is directly connected to the fifth electrode portion 1133 of the first connection sub-electrode 133 (or second connection sub-electrode 134) located on the right side of the seventh electrode portion 1135.

For example, the orthographic projection of each data line 120 on the first electrode layer overlaps with at least one of the fifth trace portion 114 and the seventh trace portion 116 of the corresponding first broken line structure 111.

For example, as shown in FIG. 9A, the gate line 110 is located within a gap formed by two sides 2211 and 2212, which are opposite in the fourth direction DA (perpendicular to the extension direction of the black matrix unit 221), of the orthographic projection of the black matrix unit 221 on the first electrode layer, that is, the gate line 110 is located within the orthographic projection of the black matrix unit 221 on the first electrode layer.

For example, as shown in FIG. 9B, the first electrode layer further includes a plurality of pixel electrodes 135; each of the plurality of pixel electrodes 135 is disposed (e.g., completely located) in the corresponding light control pixel unit 130. For example, the plurality of pixel electrodes 135 are in one-to-one correspondence to the plurality of light control pixel units 130. For example, the pixel electrodes 135 are disposed at intervals from each other, and the pixel electrodes 135 are not electrically connected with each other. As shown in FIG. 9B, the pixel electrodes 135 are disposed at intervals with the gate lines 110. For example, the width L2 of the space between each gate line 110 and the corresponding pixel electrode 135 in the fourth direction DA can be set according to practical application requirements, which is not specifically limited by the embodiments of the present disclosure. For example, the width L2 of the space between each gate line 110 and the corresponding pixel electrode 135 in the fourth direction DA may be equal to 6-10 microns (for example, 7.5 microns).

For example, as shown in FIG. 9B, each of the pixel electrodes 135 is a plate electrode, and the orthographic projection of the plate electrode on the second electrode layer is a continuous plane. For example, as shown in FIG. 9B, there are slits among the strip electrodes 132, and the orthographic projection of the pixel electrode 135 on the second electrode layer is exposed from the above slits, so that the electric field formed by the pixel electrode 135 and the common electrode 131 may enter the side of the second electrode layer away from the first electrode layer (into the liquid crystal layer 300), and drive the liquid crystal molecules in the liquid crystal layer 300 to rotate as required.

For example, the pixel electrode 135 and the gate line 110 are formed in different patterning processes, respectively. For example, the pixel electrode 135 may be formed by a transparent conductive material. For example, the transparent conductive material is indium tin oxide (ITO) or indium zinc oxide (IZO). For example, by making the first electrode layer include the gate lines 110 and the pixel electrodes 135 at the same time, the number of insulation layers provided in the direction perpendicular to the first base substrate 101 can be reduced, thereby reducing the thickness of the array substrate 100.

For example, as shown in FIG. 10A, each light control pixel unit 130 further includes a switching element 151, for example, the switching element 151 is a thin film transistor; the thin film transistor includes a gate electrode, a source electrode, and a drain electrode. For example, the gate electrode of the thin film transistor is in the same layer as the gate line 110 and is electrically connected with the gate line 110, one of the source electrode and the drain electrode of the thin film transistor is in the same layer as the data line 120 and is electrically connected with the data line 120, and the other one of the source electrode and the drain electrode of the thin film transistor is electrically connected with the pixel electrode 135 (for example, electrically connected through a hole). For example, the pixel electrode 135 is configured to receive the data signal provided by the data line 120. For example, the data signals received by the pixel electrodes 135 included in different light control pixel units 130 may not be completely the same, and may vary according to display requirements. For example, the number of the switching elements 151 is equal to the number of the first broken line structures 111.

For example, the gate line 110 is configured to receive a gate scan signal. For example, the gate line 110, the data line 120, and a common electrode line 140 are configured to be connected to different signal sources.

For example, as shown in FIG. 6A, FIG. 6B, and FIG. 10A, the array substrate 100 further includes a plurality of common electrode lines 140, each of the plurality of common electrode lines 140 integrally extends along the second direction D2, and includes a plurality of third broken line structures 141 that are connected directly in sequence in the second direction D2. For example, the common electrode 131 is configured to receive a common voltage signal, for example, the common voltage signal is a constant voltage signal. For example, the common electrodes 131 are configured to be electrically connected to each other via the common electrode lines 140, so that the plurality of common voltage signals on the plurality of common electrodes 131 are the same as each other. For example, the common electrode lines 140 and the data lines 120 are alternately arranged in the first direction D1.

For example, as shown in FIG. 6A, FIG. 6B, and FIG. 10A, each of the third broken line structures 141 includes an eighth trace portion 142 and a ninth trace portion 143 directly connected in sequence, and each of the eighth trace portion 142 and the ninth trace portion 143 intersects with both the first direction D1 and the second direction D2. For example, the extension direction of the eighth trace portion 142 and the extension direction of the ninth trace portion 143 are the same as the extension direction of the third electrode portion 1321 and the extension direction of the fourth electrode portion 1322, respectively. For example, the eighth trace portion 142 and the ninth trace portion 143 overlap with the third electrode portion 1321 and the fourth electrode portion 1322 in the first direction D1, respectively.

For example, the orthographic projection of each common electrode line 140 on the first electrode layer overlaps with the intersection of the first trace portion 112 and the second trace portion 113 of the corresponding first broken line structure 111. For another example, the orthographic projection of each common electrode line 140 on the first electrode layer overlaps with the sixth trace portion 115 of the corresponding first broken line structure 111.

For example, the common electrode 131 may be made of a transparent conductive material. For example, the transparent conductive material is indium tin oxide (ITO) or indium zinc oxide (IZO). For another example, the common electrode 131 may be made of a metal material. For example, the first base substrate 101 and the second base substrate 210 may be transparent substrates. For example, the transparent substrate may be a glass substrate, a quartz substrate, a plastic substrate (e.g., a polyethylene terephthalate (PET) substrate), or a substrate made of other suitable materials. For example, the first insulation layer 102 and the second insulation layer 103 may be made of inorganic or organic materials. For example, the first insulation layer 102 and the second insulation layer 103 may be made of organic resin, silicon oxide (SiOx), silicon oxynitride (SiNxOy), or silicon nitride (SiNx). For example, the data line 120 may be made of a metal material (e.g., copper, aluminum, or an aluminum alloy). For example, the data line layer may be disposed between the first insulation layer 102 and the second insulation layer 103.

At least one embodiment of the present disclosure also provides a display device 01. For example, the display device 01 may be implemented as a display device based on ADS (Advanced Super Dimension Switch) technology or a display device based on IPS-ADS (i.e., i-ADS, In-Plane Switching-Advanced Super Dimension Switch) technology.

Figure 11:
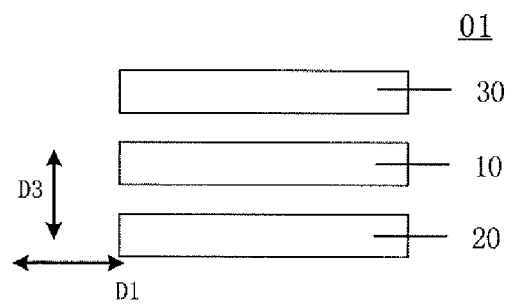
FIG. 11 is a schematic cross-sectional view of a display device according to at least one embodiment of the present disclosure.

FIG. 11 is a schematic cross-sectional view of a display device 01 provided by at least one embodiment of the present disclosure. As shown in FIG. 11, the display device 01 includes a display panel 30, a backlight unit 20, and any one of the light control panels 10 provided by at least one embodiment of the present disclosure; the display panel 30, the backlight unit 20, and the light control panel 10 are stacked on each other in the third direction D3. The display panel 30 is located at the light emission side of the light control panel 10, and the backlight unit 20 is located at the side of the light control panel 10 away from the display panel 30. For example, as shown in FIG. 11, the display panel 30, the light control panel 10, and the backlight unit 20 are sequentially arranged in the third direction D3. For example, the array substrate 100 of the light control panel 10 is closer to the backlight unit 20 than the opposite substrate 201 of the light control panel 10.

Figure 12A:
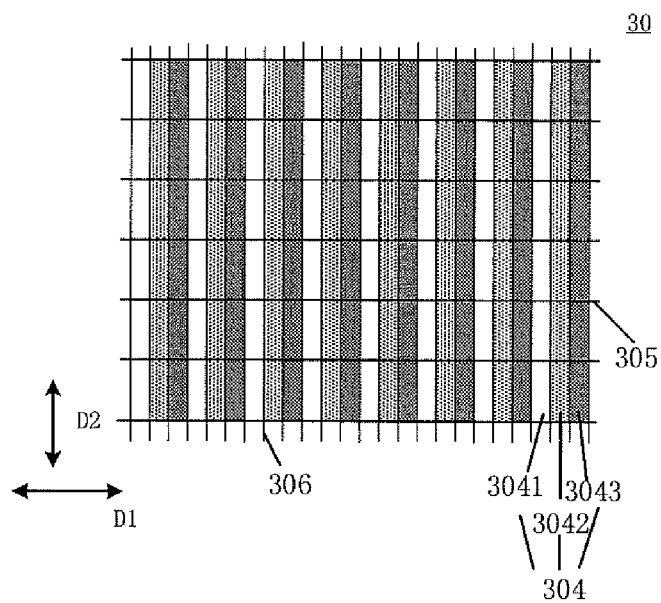
FIG. 12A is a schematic plane view of a display panel of the display device shown in FIG. 11.

FIG. 12A is a schematic plane view of the display panel 30 of the display device 01 shown in FIG. 11. As shown in FIG. 12A, the display panel 30 includes a plurality of first signal lines 305 extending along a first direction D1 and a plurality of second signal lines 306 extending along a second direction D2. The first signal lines 305 and the second signal lines 306 intersect to define a plurality of display sub-pixel units arranged in an array, and the plurality of display sub-pixel units constitute a plurality of display pixel units 304 arranged in an array. For example, the first signal line 305 is the gate line of the display panel 20 and the second signal line 306 is the data line of the display panel 30. For example, the plurality of first signal lines 305 and the plurality of second signal lines 306 are connected to different signal sources.

As shown in FIG. 12A, each display pixel unit 304 includes a first display sub-pixel unit 3041, a second display sub-pixel unit 3042, and a third display sub-pixel unit 3043; the first display sub-pixel unit 3041, the second display sub-pixel unit 3042, and the third display sub-pixel unit 3043 are, for example, a red display sub-pixel unit, a green display sub-pixel unit, and a blue display sub-pixel unit, respectively.

Figure 12B:
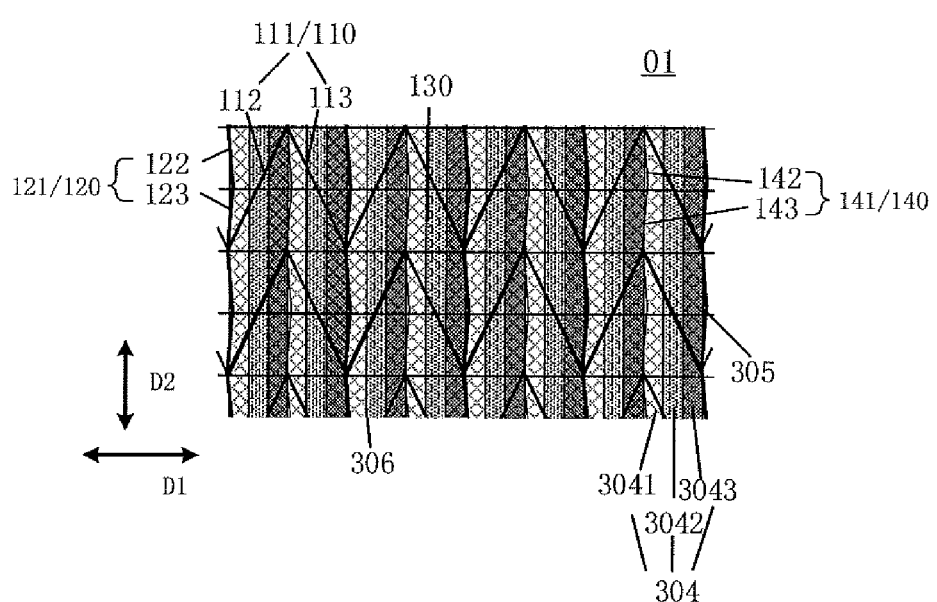
FIG. 12B is a schematic plane view of the display device shown in FIG. 11.

FIG. 12B is a schematic plane view of the display device 01 shown in FIG. 11. For example, as shown in FIG. 12B, the size of each light control pixel unit 130 in the first direction D1 is equal to twice the size of each display pixel unit 304 in the first direction D1, and the size of each light control pixel unit 130 in the second direction D2 is equal to or slightly smaller than four times the size of each display pixel unit 304 in the second direction D1.

For example, the display device 01 further includes an isotropic diffusion film (not shown in the figure) disposed between the display panel 30 and the light control panel 10. The isotropic diffusion film can diffuse the light emitted from the light control panel 10 in a small angle range, thus blurring the pattern of the data lines and further eliminating moiré pattern, and at the same time, the isotropic diffusion film does not have a great influence on the direction of the light emitted from the light control panel 10.

For example, the display device 01 may be any products or components having a display function, such as: a mobile phone, a tablet computer, a television, a monitor, a notebook computer, a digital photo frame, a navigator, or the like. It should be noted that other components of the display device 01 (for example, the control device, the image data encode/decode device, the row scan driver, the column scan driver, the clock circuit, etc.) may adopt suitable components, which should be understood by those skilled in the art, and will not be described in detail here, and should not be taken as a limitation of the present disclosure.

Although detailed description has been given above to the present disclosure with general description and specific implementations, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What have been described above are only exemplary implementations of the present disclosure, and are not intended to limit the scope of protection of the present disclosure, and the scope of protection of the present disclosure is determined by the appended claims.

What is claimed is:

1. An array substrate, comprising a data line layer, and a base substrate, a first electrode layer, an insulation layer, and a second electrode layer, which are arranged in sequence,
   wherein the first electrode layer comprises a plurality of gate lines, each of the plurality of gate lines integrally extends along a first direction, and comprises a plurality of first broken line structures directly connected in sequence in the first direction;
   the data line layer comprises a plurality of data lines, each of the plurality of data lines integrally extends along a second direction crossing with the first direction;
   the plurality of gate lines and the plurality of data lines cross each other to define a plurality of light control pixel units;
   the second electrode layer comprises a plurality of common electrodes arranged in an array, each of the plurality of common electrodes is provided in at least one of the plurality of light control pixel units;
   at least one of the plurality of gate lines at least partially overlaps with an orthographic projection of at least one of the plurality of common electrodes on the first electrode layer;
   wherein each of the plurality of common electrodes comprises a plurality of strip electrodes arranged side by side in the first direction, and a first connection sub-electrode and a second connection sub-electrode that serve as two sides, which are opposite in the second direction, of each of the plurality of common electrodes; and
   the first connection sub-electrode is connected with first ends of the plurality of strip electrodes, the second connection sub-electrode is connected with second ends of the plurality of strip electrodes.

2. The array substrate according to claim 1, wherein orthographic projections of two sides, which are opposite in the second direction, of each of the plurality of common electrodes on the first electrode layer respectively overlap with sides, which are close to each of the plurality of common electrodes, of corresponding two gate lines.

3. The array substrate according to claim 2, wherein a space is provided between two common electrodes adjacent in the second direction, and a gate line overlapping with orthographic projections of the two common electrodes adjacent in the second direction on the first electrode layer overlaps with an orthographic projection of the space on the first electrode layer.

4. The array substrate according to claim 3, wherein orthographic projections of the first connection sub-electrode and the second connection sub-electrode on the first electrode layer partially overlap with sides, which are close to each of the plurality of common electrodes, of corresponding two gate lines, respectively.

5. The array substrate according to claim 2, wherein orthographic projections of the first connection sub-electrode and the second connection sub-electrode on the first electrode layer partially overlap with sides, which are close to each of the plurality of common electrodes, of corresponding two gate lines, respectively.

6. The array substrate according to claim 2, wherein the first electrode layer further comprises a plurality of pixel electrodes;
   each of the plurality of pixel electrodes is disposed in a corresponding light control pixel unit; and
   the plurality of pixel electrodes are disposed at intervals with the plurality of gate lines.

7. The array substrate according to claim 1, wherein orthographic projections of the first connection sub-electrode and the second connection sub-electrode on the first electrode layer partially overlap with sides, which are close to each of the plurality of common electrodes, of corresponding two gate lines, respectively.

8. The array substrate according to claim 7, wherein each of the first connection sub-electrode and the second connection sub-electrode has an identical extension trend with corresponding regions of the plurality of gate lines, the corresponding regions of the plurality of gate lines are regions of the plurality of gate lines that overlap with each of the first connection sub-electrode and the second connection sub-electrode in the second direction; and the plurality of strip electrodes have an identical extension trend with corresponding regions of the plurality of data lines, the corresponding regions of the plurality of data lines are regions of the plurality of data lines that overlap with the plurality of strip electrodes in the first direction.

9. The array substrate according to claim 8, wherein each of the plurality of data lines comprises a plurality of second broken line structures directly connected in sequence in the second direction; and the plurality of first broken line structures comprised in the plurality of gate lines are in one-to-one correspondence to the plurality of light control pixel units, and the plurality of second broken line structures comprised in the plurality of data lines are in one-to-one correspondence to the plurality of light control pixel units.

10. The array substrate according to claim 7, wherein each of the plurality of data lines comprises a plurality of second broken line structures directly connected in sequence in the second direction; and the plurality of first broken line structures comprised in the plurality of gate lines are in one-to-one correspondence to the plurality of light control pixel units, and the plurality of second broken line structures comprised in the plurality of data lines are in one-to-one correspondence to the plurality of light control pixel units.

11. The array substrate according to claim 1, wherein the first electrode layer further comprises a plurality of pixel electrodes;

each of the plurality of pixel electrodes is disposed in a corresponding light control pixel unit; and the plurality of pixel electrodes are disposed at intervals with the plurality of gate lines.

12. The array substrate according to claim 11, wherein the plurality of pixel electrodes are plate electrodes, and an orthographic projection of each of the plate electrodes on the second electrode layer is a continuous plane.

13. The array substrate according to claim 11, wherein orthographic projections of the first connection sub-electrode and the second connection sub-electrode on the first electrode layer partially overlap with sides, which are close to each of the plurality of common electrodes, of corresponding two gate lines, respectively; and an orthographic projection of each of the plurality of pixel electrodes on the second electrode layer is exposed from spaces between adjacent strip electrodes comprised in a corresponding common electrode.

14. The array substrate according to claim 11, wherein each of the plurality of common electrodes and the plurality of pixel electrodes comprises a transparent conductive oxide, and each of the plurality of gate lines comprises metal.

15. The array substrate according to claim 1, wherein a surface of a side, which is close to the second electrode layer, of each of the plurality of gate lines has a concave-convex structure.

16. A light control panel, comprising: an array substrate, an opposite substrate, and a liquid crystal layer, wherein the array substrate and the opposite substrate are arranged oppositely, and the liquid crystal layer is sandwiched between the array substrate and the opposite substrate;

the array substrate comprises a data line layer, and a base substrate, a first electrode layer, an insulation layer, and a second electrode layer, which are arranged in sequence, the first electrode layer comprises a plurality of gate lines, each of the plurality of gate lines integrally extends along a first direction, and comprises a plurality of first broken line structures directly connected in sequence in the first direction;

the data line layer comprises a plurality of data lines, each of the plurality of data lines integrally extends along a second direction crossing with the first direction;

the plurality of gate lines and the plurality of data lines cross each other to define a plurality of light control pixel units;

the second electrode layer comprises a plurality of common electrodes arranged in an array, each of the plurality of common electrodes is provided in at least one of the plurality of light control pixel units;

at least one of the plurality of gate lines at least partially overlaps with an orthographic projection of at least one of the plurality of common electrodes on the first electrode layer;

wherein each of the plurality of common electrodes comprises a plurality of strip electrodes arranged side by side in the first direction, and a first connection sub-electrode and a second connection sub-electrode that serve as two sides, which are opposite in the second direction, of each of the plurality of common electrodes; and the first connection sub-electrode is connected with first ends of the plurality of strip electrodes, the second connection sub-electrode is connected with second ends of the plurality of strip electrodes.

17. The light control panel according to claim 16, wherein the opposite substrate comprises a black matrix layer; the black matrix layer comprises a plurality of black matrix units, and each of the plurality of black matrix units integrally extends along the first direction; and orthographic projections of the plurality of gate lines on the black matrix layer are located in corresponding black matrix units, respectively.

18. The light control panel according to claim 17, wherein each of the plurality of black matrix units comprises a plurality of black matrix structures directly connected in sequence in the first direction, and orthographic projections of the plurality of first broken line structures comprised in the plurality of gate lines on the black matrix layer are located in corresponding black matrix structures, respectively.

19. The light control panel according to claim 17, wherein a ratio of a width of each of the plurality of black matrix units to a width of a corresponding gate line is between 1 and 2.5.

20. A display device, comprising: a display panel, a backlight unit, and a light control panel, wherein the display panel, the light control panel, and the backlight unit are stacked on each other, the display panel is located at a light emission side of the light control panel, and the backlight unit is located at a side of the light control panel away from the display panel;

the light control panel comprises an array substrate, an opposite substrate, and a liquid crystal layer;

the array substrate and the opposite substrate are arranged oppositely, and the liquid crystal layer is sandwiched between the array substrate and the opposite substrate;

the array substrate comprises a data line layer, and a base substrate, a first electrode layer, an insulation layer, and a second electrode layer, which are arranged in sequence, the first electrode layer comprises a plurality of gate lines, each of the plurality of gate lines integrally extends along a first direction, and comprises a plurality of first broken line structures directly connected in sequence in the first direction;

the data line layer comprises a plurality of data lines, each of the plurality of data lines integrally extends along a second direction crossing with the first direction;

the plurality of gate lines and the plurality of data lines cross each other to define a plurality of light control pixel units;

the second electrode layer comprises a plurality of common electrodes arranged in an array, each of the plurality of common electrodes is provided in at least one of the plurality of light control pixel units;

at least one of the plurality of gate lines at least partially overlaps with an orthographic projection of at least one of the plurality of common electrodes on the first electrode layer;

wherein each of the plurality of common electrodes comprises a plurality of strip electrodes arranged side by side in the first direction, and a first connection sub-electrode and a second connection sub-electrode that serve as two sides, which are opposite in the second direction, of each of the plurality of common electrodes; and the first connection sub-electrode is connected with first ends of the plurality of strip electrodes, the second connection sub-electrode is connected with second ends of the plurality of strip electrodes.

* * * * *